US012801223B2

(12) United States Patent
Yamamoto et al.

(10) Patent No.: US 12,801,223 B2
(45) Date of Patent: Nov. 17, 2026

(54) VIRTUAL SPACE INTERFACE DEVICE AND METHOD WITH CONTROL BASED ON POSITION OF HANDS WITH RESPECT TO USER'S FACE

(71) Applicant: JVCKENWOOD Corporation, Kanagawa (JP)

(72) Inventors: Shunsuke Yamamoto, Yokohama (JP); Aiko Takiwaki, Yokohama (JP); Moe Fujishima, Kanagawa (JP); Yuichi Matsumoto, Kanagawa (JP); Hyungjun Kim, Kanagawa (JP); Yu Hayashishita, Yokohama (JP); Yukako Sato, Yokohama (JP); Kazuya Seki, Yokohama (JP); Minoru Shiga, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/090,027

(22) Filed: Mar. 25, 2025

(65) Prior Publication Data

US 2025/0348150 A1 Nov. 13, 2025

Related U.S. Application Data

(63) Continuation of application No. PCT/JP2023/023221, filed on Jun. 22, 2023.

(30) Foreign Application Priority Data

Sep. 27, 2022 (JP) ................................ 2022-153488

(51) Int. Cl.
*G06F 3/01* (2006.01)
*G06F 3/16* (2006.01)
(Continued)

(52) U.S. Cl.
CPC .............. *G06F 3/017* (2013.01); *G06F 3/165* (2013.01); *G06F 3/167* (2013.01); *G06T 3/40* (2013.01);
(Continued)

(58) Field of Classification Search
CPC .......... G06F 3/165; G06F 3/167; G06F 3/011; G06F 3/04845; G06T 3/40; G06T 7/70;
(Continued)

(56) References Cited

U.S. PATENT DOCUMENTS

2018/0311585 A1* 11/2018 Osman .................... A63F 13/26
2018/0349087 A1 12/2018 Park et al.
2020/0209952 A1* 7/2020 Järvinen ................ G06F 3/017

FOREIGN PATENT DOCUMENTS

JP 2012-235887 A 12/2012
JP 5102662 B 12/2012
(Continued)

*Primary Examiner* — Liliana Cerullo
(74) *Attorney, Agent, or Firm* — PROCOPIO, CORY, HARGREAVES & SAVITCH LLP

(57) ABSTRACT

A virtual space interface device generates display data for causing a client terminal to display an image showing a situation in a virtual space, generates sound data for outputting a user-uttered sound picked up by the terminal into the virtual space, and generates sound data for causing the terminal to output a sound in the virtual space. The display data and the sound data are controlled on the basis of a gesture of the user and a positional relationship between the user and the terminal. A control target differs in accordance with a part of a face area where the user positions the user's hands.

7 Claims, 11 Drawing Sheets

(51) Int. Cl.
*G06T 3/40* (2006.01)
*G06T 7/70* (2017.01)

(52) U.S. Cl.
CPC ...... *G06T 7/70* (2017.01); *G06T 2207/30201* (2013.01)

(58) Field of Classification Search
CPC ........... G06T 2207/30201; G06T 13/20; G06T 19/00
See application file for complete search history.

(56) References Cited

FOREIGN PATENT DOCUMENTS

| | | | |
|---|---|---|---|
| JP | 2013-012158 | A | 1/2013 |
| JP | 2013-196140 | A | 9/2013 |
| JP | 5636888 | B | 12/2014 |
| JP | 2020-518321 | A | 6/2020 |
| JP | 6802549 | B | 12/2020 |
| JP | 7090031 | B | 6/2022 |
| WO | 2018/150831 | A1 | 8/2018 |

* cited by examiner

VIRTUAL SPACE INTERFACE DEVICE AND METHOD WITH CONTROL BASED ON POSITION OF HANDS WITH RESPECT TO USER'S FACE

TECHNICAL FIELD

The present invention relates to a virtual space interface device, a client terminal, a computer readable non-transitory storage medium storing a program, and a virtual space interface control method.

CROSS REFERENCE TO RELATED APPLICATION

Priority is claimed on Japanese Patent Application No. 2022-153488, the content of which is incorporated herein by reference.

BACKGROUND ART

Patent Document 1 describes a virtual space providing device that provides a virtual space to a client computer connected via a communication network. As described in Patent Document 1, a virtual space providing system is configured to include the virtual space providing device and a client device serving as the client computer, avatars and the like are arranged in the virtual space, the virtual space providing device is configured as a server, the virtual space is displayed on the client device, and the like.

Meanwhile, in the technology described in Patent Document 1, for example, an operation unit (an input device such as a keyboard switch or a pointing device) provided in the client device is used to move a user's avatar in the virtual space, change the avatar's facial expression, or change the avatar's posture. Therefore, in the technology described in Patent Document 1, only users familiar with how to use the operation unit can use the virtual space providing system and convenience for the user cannot be improved.

Patent Document 2 describes that a camera captures an image of the user's face, that the image is used to identify the proximity of the user's face to the camera, that a zoom-in or zoom-out function is controlled using the relative position of the device (camera) with respect to the user's face, and the like.

Meanwhile, in an input operation using the relative position of the camera with respect to the user's face, information that can be input is limited (i.e., an amount of information that can be input is small). Therefore, even if the technology described in Patent Document 2 is applied to the technology described in Patent Document 1, convenience for the user of the virtual space providing system described in Patent Document 1 cannot be improved.

CITATION LIST

Patent Document

[Patent Document 1] Japanese Patent No. 5102662
[Patent Document 2] Published Japanese Translation No. 2020-518321 of the PCT International Publication
[Patent Document 3] Japanese Patent No. 5636888
[Patent Document 4] Japanese Patent No. 7090031
[Patent Document 5] Japanese Patent No. 6802549

SUMMARY OF INVENTION

According to an aspect of the present invention, there is provided a virtual space interface device provided in a virtual space providing system having at least a client terminal used by a user, wherein the client terminal includes a display device configured to display an image showing a situation in the virtual space, a sound output device configured to output a sound in the virtual space, a sound pickup device configured to pick up a sound uttered by the user, and a photographing device configured to capture a facial image of the user, wherein the virtual space interface device includes a display data generating unit configured to generate display data for causing the display device of the client terminal to display an image showing a situation in the virtual space and a sound data generating unit configured to generate sound data for causing the sound output device of the client terminal to output a sound in the virtual space, wherein the sound data generating unit generates sound data for outputting the user-uttered sound picked up by the sound pickup device of the client terminal into the virtual space, wherein the display data generating unit and the sound data generating unit control at least one item of the display data for causing the display device of the client terminal to display the image showing the situation in the virtual space, the sound data for causing the sound output device of the client terminal to output the sound in the virtual space, and the sound data for outputting the sound uttered by the user into the virtual space, as a control target, on the basis of a gesture of positioning the user's hands at an area of the user's face photographed by the photographing device of the client terminal and a positional relationship between the photographing device of the client terminal and the user's face, and wherein the display data generating unit and the sound data generating unit differentiate the control target in accordance with a part of the face area where the user positions the user's hands.

According to an aspect of the present invention, there is provided a virtual space interface device provided in a virtual space providing system having at least a client terminal used by a user, wherein the client terminal includes a sound output device configured to output a sound in the virtual space, a sound pickup device configured to pick up a sound uttered by the user, and a photographing device configured to capture a facial image of the user, wherein the virtual space interface device includes a sound data generating unit configured to generate sound data for causing the sound output device of the client terminal to output a sound in the virtual space, wherein the sound data generating unit generates sound data for outputting the user-uttered sound picked up by the sound pickup device of the client terminal into the virtual space, and wherein the sound data generating unit controls at least one item of the sound data for causing the sound output device of the client terminal to output the sound in the virtual space and the sound data for outputting the sound uttered by the user into the virtual space, as a control target, on the basis of a gesture of positioning the user's hands at an area of the user's face photographed by the photographing device of the client terminal and a positional relationship between the photographing device of the client terminal and the user's face.

According to an aspect of the present invention, there is provided a virtual space interface control method for controlling a virtual space providing system having at least a client terminal used by a user, the virtual space interface control method including: generating, by a computer, display data for causing a display device of the client terminal to display an image showing a situation in a virtual space; generating, by the computer, first sound data for outputting a user-uttered sound picked up by a sound pickup device of the client terminal into the virtual space; generating, by the computer, second sound data for causing a sound output device of the client terminal to output a sound in the virtual space; and performing, by the computer, control by differentiating at least one item of the display data, the first sound data, and the second sound data in accordance with a part of a face area where the user positions the user's hands on the basis of a gesture of positioning the user's hands at an area of the user's face photographed by a photographing device of the client terminal and a positional relationship between the photographing device of the client terminal and the user's face.

DESCRIPTION OF EMBODIMENTS

Embodiments of a virtual space interface device, a client terminal, and a program of the present invention will be described below with reference to the accompanying drawings.

First Embodiment

Figure 1:
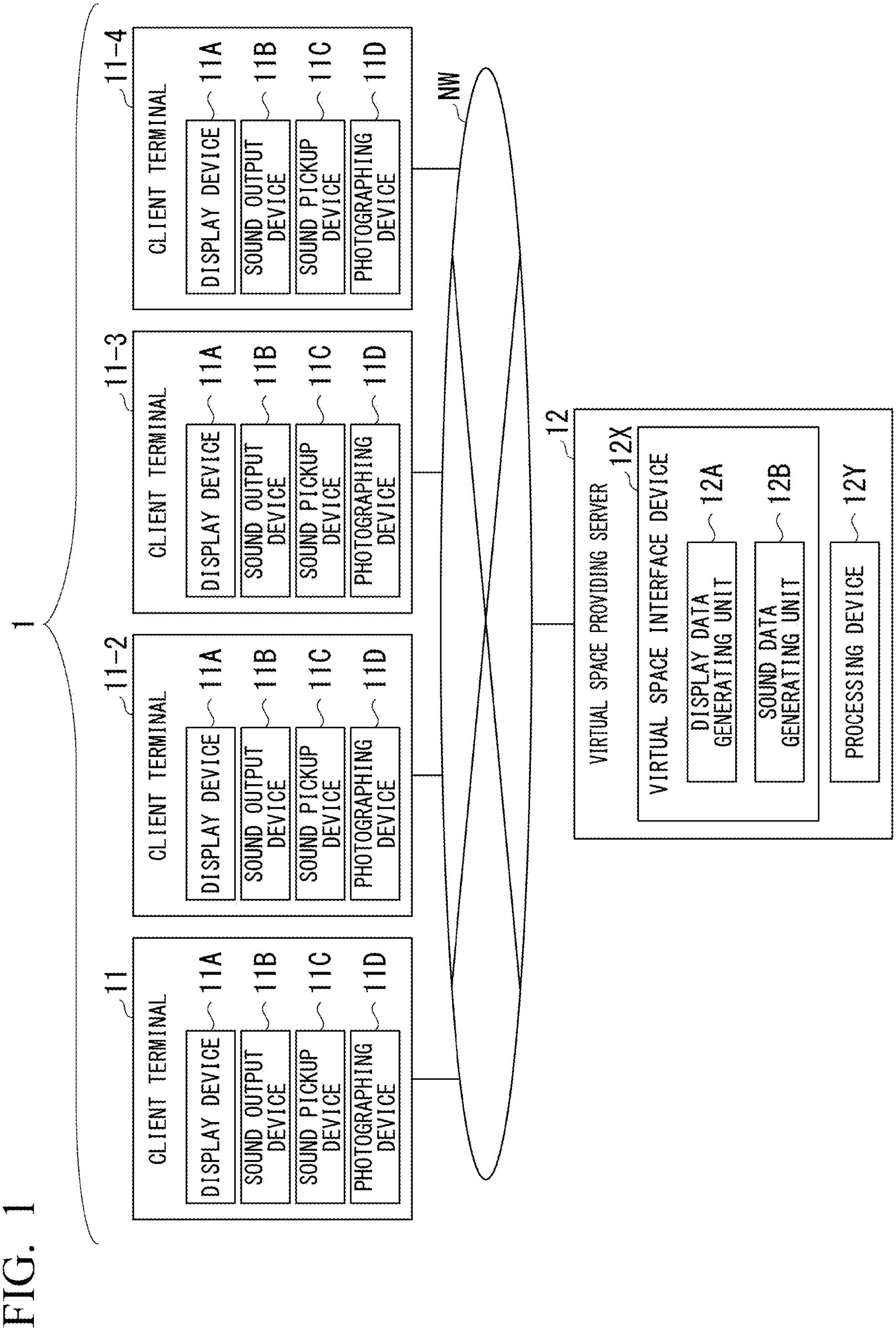
FIG. 1 A diagram showing an example of a virtual space providing system 1 to which a virtual space interface device 12X of a first embodiment is applied.

FIG. 1 is a diagram showing an example of a virtual space providing system 1 to which a virtual space interface device 12X of the first embodiment is applied.

In the example shown in FIG. 1, the virtual space providing system 1 includes client terminals 11, 11-2, 11-3, and 11-4 and a virtual space providing server 12. The client terminals 11, 11-2, 11-3, and 11-4 and the virtual space providing server 12 are connected via a network NW such as the Internet.

Although the virtual space providing system 1 has the four client terminals 11, 11-2, 11-3, and 11-4 in the example shown in FIG. 1, the virtual space providing system 1 may have any number of client terminals other than four in another example. In other words, the number of client terminals provided in virtual space providing system 1 may be one.

Figure 3:
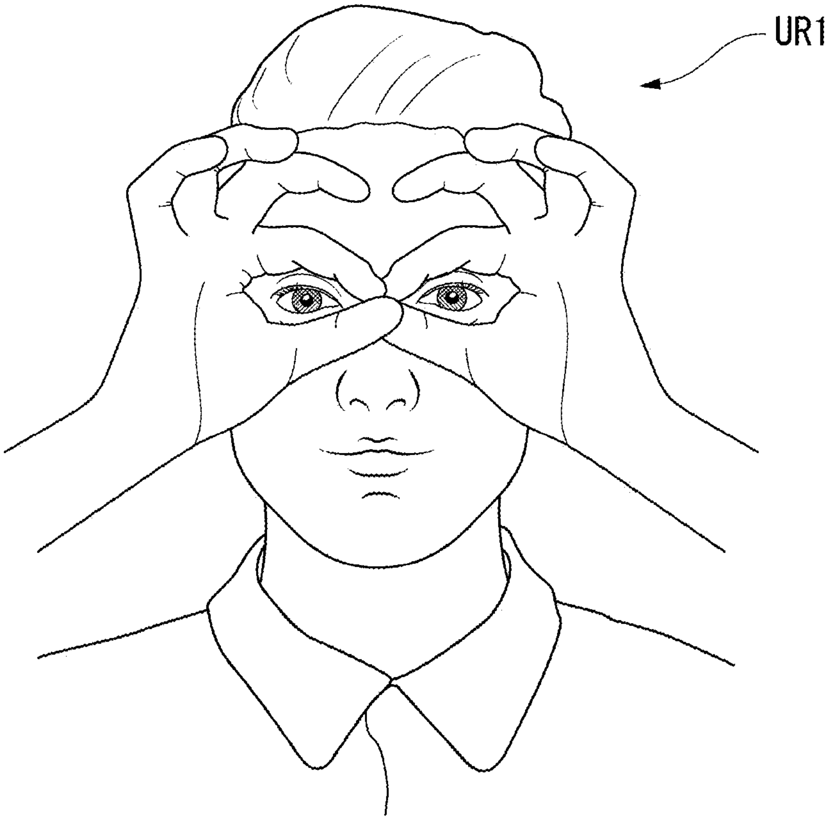
FIG. 3 An explanatory diagram of an example of an action of a first user UR1 placing the hands of the first user UR1 over the eyes of the first user UR1.

In the example shown in FIG. 1, the client terminal 11 is used by, for example, a first user UR1 (see FIG. 3). The client terminal 11 includes a display device 11A, a sound output device 11B, a sound pickup device 11C, and a photographing device 11D.

The display device 11A displays an image (see FIG. 2) showing the situation in the virtual space on the basis of display data provided by the virtual space providing server 12 via the network NW. The display device 11A includes, for example, a display and the like. The sound output device 11B outputs a sound in a virtual space on the basis of sound data provided by the virtual space providing server 12 via the network NW. The sound output device 11B includes, for example, a speaker and the like. The sound pickup device 11C picks up a sound uttered by the first user UR1. The sound pickup device 11C includes, for example, a microphone and the like. The photographing device 11D captures an image of the face of the first user UR1. The photographing device 11D includes, for example, a camera and the like.

The client terminal 11-2 is used, for example, by a second user UR2 (see FIG. 8) different from the first user UR1. The client terminal 11-3 is used, for example, by a third user UR3 (see FIG. 9) different from the first user UR1 and the second user UR2.

The client terminal 11-4 is used, for example, by a fourth user different from the first user UR1, the second user UR2, and the third user UR3.

In the example shown in FIG. 1, each of the client terminals 11-2, 11-3, and 11-4 is configured like the client terminal 11. That is, each of the client terminals 11-2, 11-3, and 11-4 includes a display device 11A, a sound output device 11B, a sound pickup device 11C, and a photographing device 11D.

That is, the sound pickup device 11C of the client terminal 11-2 picks up a sound uttered by the second user UR2. The photographing device 11D of the client terminal 11-2 captures a facial image of the second user UR2. The sound pickup device 11C of the client terminal 11-3 picks up the sound uttered by the third user UR3. The photographing device 11D of the client terminal 11-3 captures a facial image of the third user UR3. The sound pickup device 11C of the client terminal 11-4 picks up the sound uttered by the fourth user. The photographing device 11D of the client terminal 11-4 captures a facial image of the fourth user.

In other examples, configurations of the client terminal 11, the client terminal 11-2, the client terminal 11-3, and the client terminal 11-4 may be different or a configuration of any one of the client terminals 11, 11-2, 11-3, and 11-4 may be different from the configuration of the remaining client terminals.

In the example shown in FIG. 1, the virtual space providing server 12 provides the virtual space by providing display data and sound data to the client terminals 11, 11-2, 11-3, and 11-4. The virtual space providing server 12 includes the virtual space interface device 12X and a processing device 12Y. The virtual space interface device 12X includes a display data generating unit 12A and a sound data generating unit 12B.

The display data generating unit 12A generates display data for causing the display device 11A of each of the client terminals 11, 11-2, 11-3, and 11-4 to display an image showing the situation in the virtual space. In other words, the display data generating unit 12A generates display data for causing the display device 11A of the client terminal 11 to display an image showing the situation in the virtual space (see FIG. 2), display data for causing the display device 11A of the client terminal 11-2 to display the image showing the situation in the virtual space, display data for causing the display device 11A of the client terminal 11-3 to display the image showing the situation in the virtual space, and display data for causing the display device 11A of the client terminal 11-4 to display the image showing the situation in the virtual space.

In detail, the display data generating unit 12A generates a first avatar AT1 (see FIG. 2) positioned in the virtual space on the basis of a facial image of the first user UR1 captured by the photographing device 11D of the client terminal 11 (see FIG. 3). Likewise, the display data generating unit 12A generates a second avatar AT2 (see FIG. 2) positioned in the virtual space on the basis of a facial image (see FIG. 8) of the second user UR2 captured by the photographing device 11D of the client terminal 11-2, generates a third avatar AT3 (see FIG. 2) positioned in the virtual space on the basis of a facial image (see FIG. 9) of the third user UR3 captured by the photographing device 11D of the client terminal 11-3, and generates a fourth avatar AT4 (see FIG. 2) positioned in the virtual space on the basis of a facial image of the fourth user captured by the photographing device 11D of the client terminal 11-4.

In another example, for example, the display data generating unit 12A may generate the first avatar AT1 on the basis of a recorded image that is different from the facial image of the first user UR1. In yet another example, for example, the first avatar AT1 generated by the display data generating unit 12A may be an illustration, computer graphics (CG), or the like.

In the example shown in FIG. 1, a processing device 12Y has a function of including, for example, illustrations, CG or other background images, object images, avatar images, and the like in an image showing the situation in the virtual space (i.e., an image displayed by the display device 11A of each of the client terminals 11, 11-2, 11-3, and 11-4).

In the example shown in FIG. 1, the display data generating unit 12A generates display data for a first client terminal for causing the display device 11A of the client terminal 11 to display an image including the first avatar AT1, the second avatar AT2, the third avatar AT3, and the fourth avatar AT4 (see FIG. 2) as an image showing the situation in the virtual space. Likewise, the display data generating unit 12A generates display data for a second client terminal for causing the display device 11A of the client terminal 11-2 to display an image including the first avatar AT1, the second avatar AT2, the third avatar AT3, and the fourth avatar AT4 as an image showing the situation in the virtual space, generates display data for a third client terminal for causing the display device 11A of the client terminal 11-3 to display an image including the first avatar AT1, the second avatar AT2, the third avatar AT3, and the fourth avatar AT4 as an image showing the situation in the virtual space, and generates display data for a fourth client terminal for causing the display device 11A of the client terminal 11-4 to display an image including the first avatar AT1, the second avatar AT2, the third avatar AT3, and the fourth avatar AT4 as an image showing the situation in the virtual space.

In another example, the "image showing the situation in the virtual space" shown by, for example, the display data for the first client terminal generated by the display data generating unit 12A may include a background image, objects other than the avatars, and the like in addition to the first to fourth avatars AT1 to AT4 or instead of the first to fourth avatars AT1 to AT4.

In other examples in which the "image showing the situation in the virtual space" does not include the first to fourth avatars AT1 to AT4, a video and sound that the user can view and hear at specific coordinates in the virtual space are simply acquired and output on the terminal side (the client terminals 11, 11-2, 11-3, and 11-4) and the user does not need to be linked to any object.

Figure 2:
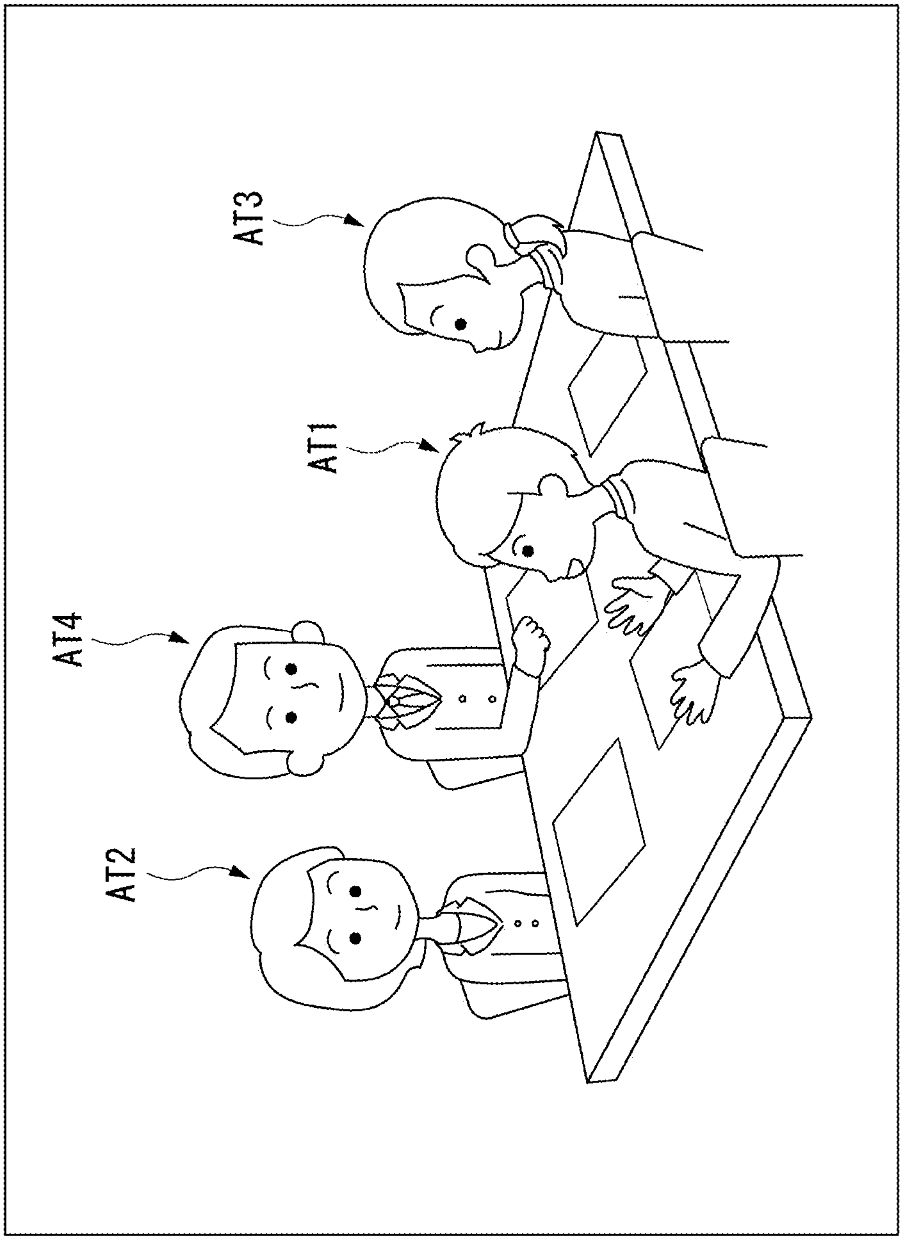
FIG. 2 A diagram showing an example of an image showing a situation in a virtual space displayed by a display device 11A of a client terminal 11 on the basis of display data for a first client terminal generated by a display data generating unit 12A.

FIG. 2 is a diagram showing an example of an image showing the situation in the virtual space displayed by the display device 11A of the client terminal 11 on the basis of the display data for the first client terminal generated by the display data generating unit 12A.

In the example shown in FIG. 2, an image showing the situation in the virtual space displayed by the display device 11A of the client terminal 11 on the basis of the display data for the first client terminal generated by the display data generating unit 12A includes the first avatar AT1 corresponding to the first user UR1 using the client terminal 11, the second avatar AT2 corresponding to the second user UR2 using the client terminal 11-2, the third avatar AT3 corresponding to the third user UR3 using the client terminal 11-3, and the fourth avatar AT4 corresponding to the fourth user using the client terminal 11-4.

In the example shown in FIG. 2, the display data generating unit 12A of the virtual space interface device 12X generates the display data for the first client terminal so that the first avatar AT1 generated on the basis of the facial image of the first user UR1 using the client terminal 11 is positioned on the frontmost side in the virtual space (the virtual space shown in FIG. 2) displayed by the display device 11A of the client terminal 11.

In detail, the display data generating unit 12A of the virtual space interface device 12X generates display data for the first client terminal so that, in the virtual space (the virtual space shown in FIG. 2) displayed by the display device 11A of the client terminal 11, the second avatar AT2 corresponding to the second user UR2 using the client terminal 11-2 is positioned on the left of the first avatar AT1, the third avatar AT3 corresponding to the third user UR3 using the client terminal 11-3 is positioned on the right of the first avatar AT1, and the fourth avatar AT4 corresponding to the fourth user using the client terminal 11-4 is positioned in front of the first avatar AT1.

In another example, the first avatar AT1 corresponding to the first user UR1 using the client terminal 11 may not be included in the image showing the situation in the virtual space displayed by the display device 11A of the client terminal 11. In this example, an image (including the second avatar AT2, the third avatar AT3, and the fourth avatar AT4) showing the situation in the virtual space as seen from the viewpoint of the first avatar AT1 (i.e., the viewpoint of the first user UR1) is displayed by the display device 11A of the client terminal 11.

In yet another example, the positions of the first avatar AT1 and others in the virtual space (the coordinates of the first user UR1 and the like) may be controlled by a controller (not shown)

In the example shown in FIG. 2, the display data generating unit 12A of the virtual space interface device 12X generates display data for the second client terminal so that the second avatar AT2 generated on the basis of the facial image of the second user UR2 using the client terminal 11-2 is positioned on the frontmost side in the virtual space displayed by the display device 11A of the client terminal 11-2.

In detail, the display data generating unit 12A of the virtual space interface device 12X generates display data for the second client terminal so that, in the virtual space displayed by the display device 11A of the client terminal 11-2, the fourth avatar AT4 corresponding to the fourth user using the client terminal 11-4 is positioned on the left of the second avatar AT2, the first avatar AT1 corresponding to the first user UR1 using the client terminal 11 is positioned on the right of the second avatar AT2, and the third avatar AT3 corresponding to the third user UR3 using the client terminal 11-3 is positioned in front of the second avatar AT2.

Furthermore, the display data generating unit 12A of the virtual space interface device 12X generates display data for the third client terminal so that the third avatar AT3 generated on the basis of the facial image of the third user UR3 using the client terminal 11-3 is positioned on the frontmost side in the virtual space displayed by the display device 11A of the client terminal 11-3.

In detail, the display data generating unit 12A of the virtual space interface device 12X generates display data for the third client terminal so that, in the virtual space displayed by the display device 11A of the client terminal 11-3, the first avatar AT1 corresponding to the first user UR1 using the client terminal 11 is positioned on the left of the third avatar AT3, the fourth avatar AT4 corresponding to the fourth user using the client terminal 11-4 is positioned on the right of the third avatar AT3, and the second avatar AT2 corresponding to the second user UR2 using the client terminal 11-2 is positioned in front of the third avatar AT3.

Moreover, the display data generating unit 12A of the virtual space interface device 12X generates display data for the fourth client terminal so that the fourth avatar AT4 generated on the basis of the facial image of the fourth user using the client terminal 11-4 is positioned on the frontmost side in the virtual space displayed by the display device 11A of the client terminal 11-4.

In detail, the display data generating unit 12A of the virtual space interface device 12X generates display data for the fourth client terminal so that, in the virtual space displayed by the display device 11A of the client terminal 11-4, the third avatar AT3 corresponding to the third user UR3 using the client terminal 11-3 is positioned on the left of the fourth avatar AT4, the second avatar AT2 corresponding to the second user UR2 using the client terminal 11-2 is positioned on the right of the fourth avatar AT4, and the first avatar AT1 corresponding to the first user UR1 using the client terminal 11 is positioned in front of the fourth avatar AT4.

Figure 4A:
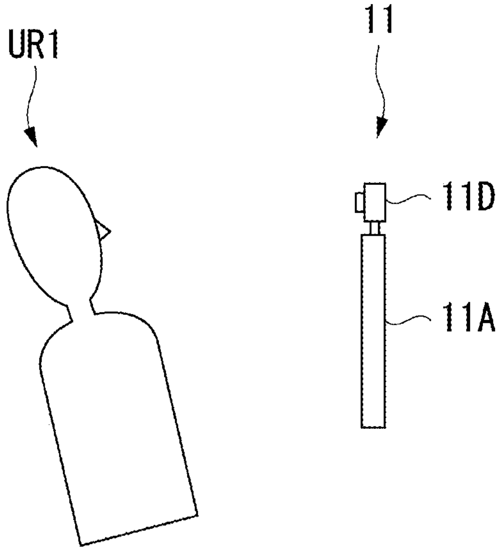
FIG. 4A A diagram showing an example of the first user UR1 bringing the face of the first user UR1 closer to a photographing device 11D of the client terminal 11.
Figure 4B:
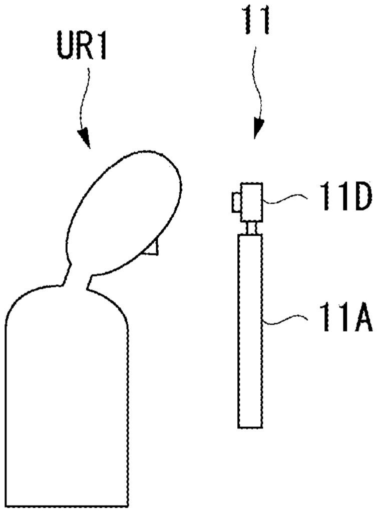
FIG. 4B A diagram showing an example of the first user UR1 bringing the face of the first user UR1 farther from the photographing device 11D of the client terminal 11.

FIG. 3 is an explanatory diagram of an example of an action of the first user UR1 placing the hands of the first user UR1 over the eyes of the first user UR1. FIG. 4 is an explanatory diagram of an example of the first user UR1 changing the distance between the photographing device 11D of the client terminal 11 and the face of the first user UR1. In detail, FIG. 4A shows an example of the first user UR1 bringing the face of the first user UR1 closer to the photographing device 11D of the client terminal 11 and FIG. 4B shows an example of the first user UR1 bringing the face of the first user UR1 farther from the photographing device 11D of the client terminal 11. FIG. 5 is an explanatory diagram of a first example of control performed by the display data generating unit 12A of the virtual space interface device 12X. In detail, FIG. 5A shows an enlarged image obtained by enlarging the image showing the situation in the virtual space shown in FIG. 2 displayed by the display device 11A of the client terminal 11 and FIG. 5B shows a reduced image obtained by reducing the image showing the situation in the virtual space shown in FIG. 2 displayed by the display device 11A of the client terminal 11.

In the example shown in FIG. 1, the display data generating unit 12A of the virtual space interface device 12X controls the enlargement and/or reduction of the image showing the situation in the virtual space (see FIG. 2) displayed by the display device 11A of the client terminal 11 on the basis of an action of first user UR1, who is photographed by the photographing device 11D of the client terminal 11, placing the hands of the first user UR1 over the eyes of the first user UR1 (see FIG. 3) and the distance between the photographing device 11D of the client terminal 11 and the face of the first user UR1 (see FIG. 4). "Controlling the enlargement and/or reduction of the image" indicates that the display data generating unit 12A, for example, has both a function of enlarging the image showing the situation in the virtual space displayed by the display device 11A of the client terminal 11 and a function of reducing the image showing the situation in the virtual space displayed by the display device 11A of the client terminal 11. The display data generating unit 12A, for example, executes control for enlarging the image showing the situation in the virtual space displayed by the display device 11A of the client terminal 11 in a first case (e.g., when the first user UR1 photographed by the photographing device 11D of the client terminal 11 makes an action of placing the hands of the first user UR1 over the eyes of the first user UR1 and makes an action of bringing the face of the first user UR1 closer to the photographing device 11D of the client terminal 11). In a second case different from the first case (e.g., when the first user UR1 photographed by the photographing device 11D of the client terminal 11 makes an action of placing the hands of the first user UR1 over the eyes of the first user UR1 and makes an action of bringing the face of the first user UR1 farther from the photographing device 11D of the client terminal 11), the display data generating unit 12A, for example, executes control for reducing the image showing the situation in the virtual space displayed by the display device 11A of the client terminal 11.

Figure 5A:
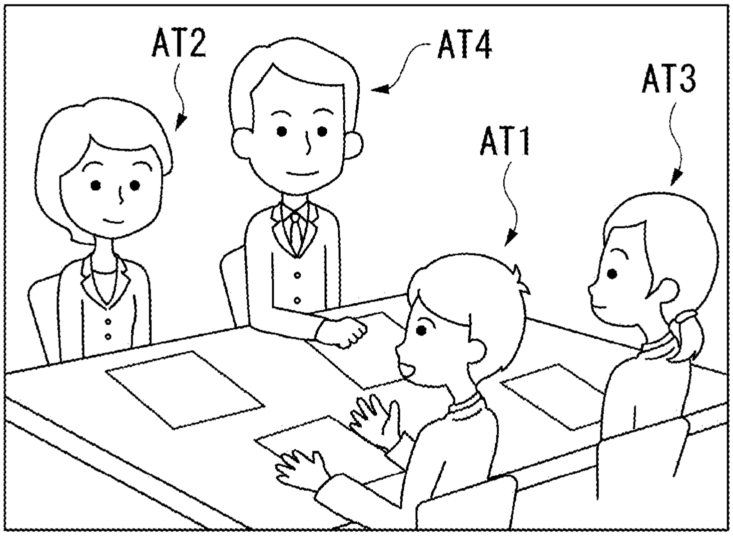
FIG. 5A A diagram showing an enlarged image obtained by enlarging an image showing a situation in the virtual space shown in FIG. 2 and displayed by the display device 11A of the client terminal 11.

Specifically, when the first user UR1 photographed by the photographing device 11D of the client terminal 11 makes an action of placing the hands of the first user UR1 over the eyes of the first user UR1 (see FIG. 3) and an action of bringing the face of the first user UR1 closer to the photographing device 11D of the client terminal 11 (see FIG. 4A), the display data generating unit 12A of the virtual space interface device 12X executes control for enlarging the image showing the situation in the virtual space (see FIG. 2) displayed by the display device 11A of the client terminal 11 and generates display data for the first client terminal for causing the display device 11A of the client terminal 11 to display the enlarged image shown in FIG. 5A.

Figure 5B:
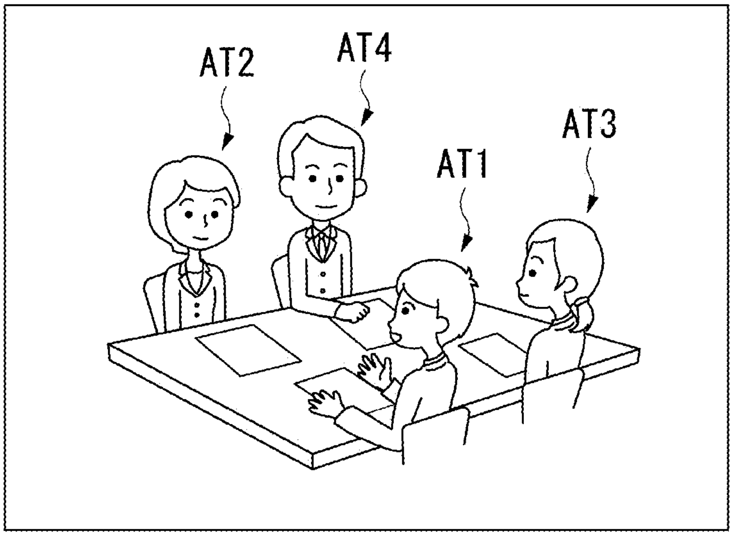
FIG. 5B A diagram showing a reduced image obtained by reducing an image showing a situation in the virtual space shown in FIG. 2 and displayed by the display device 11A of the client terminal 11.

Moreover, when the first user UR1 photographed by the photographing device 11D of the client terminal 11 makes an action of placing the hands of the first user UR1 over the eyes of the first user UR1 (see FIG. 3) and an action of bringing the face of the first user UR1 farther from the photographing device 11D of the client terminal 11 (see FIG. 4B), the display data generating unit 12A of the virtual space interface device 12X executes control for reducing the image showing the situation in the virtual space displayed by the display device 11A of the client terminal 11 (see FIG. 2) and generates display data for the first client terminal for causing the display device 11A of the client terminal 11 to display the reduced image shown in FIG. 5B.

In the example shown in FIG. 1, the display data generating unit 12A of the virtual space interface device 12X determines whether or not the first user UR1 has made the action of placing the hands of the first user UR1 over the eyes of the first user UR1 (see FIG. 3) on the basis of the facial image of the first user UR1 photographed by the photographing device 11D of the client terminal 11. The display data generating unit 12A of the virtual space interface device 12X may use a conventional technique related to currently known gesture recognition, for example, as in the method described in paragraph 0041 of Patent Document 3, to determine whether the first user UR1 has made an action of placing the hands of the first user UR1 over the eyes of the first user UR1, on the basis of a facial image of the first user UR1 captured by the photographing device 11D of the client terminal 11. The "action of the first user UR1 placing the hands of the first user UR1 over the eyes of the first user UR1" includes, for example, an action in which the first user UR1 causes the eyelid or the like of the first user UR1 to be in contact with the hand of the first user UR1, an action in which the first user UR1 brings the hands of the first user UR1 closest to the eye area of the entire face of the first user UR1 while causing the eyelid or the like of the first user UR1 not to be in contact with the hand of the first user UR1, and the like. In other words, an action in which the first user UR1 causes the face of the first user UR1 not to be in contact with the hands of the first user UR1 may also be the "action of the first user UR1 placing the hands of the first user UR1 over the eyes of the first user UR1."

In the example shown in FIG. 1, the display data generating unit 12A of the virtual space interface device 12X determines whether or not the first user UR1 has made an action of bringing the face of the first user UR1 closer to the photographing device 11D of the client terminal 11 (see FIG. 4A), whether or not the first user UR1 has made an action of bringing the face of the first user UR1 farther from the photographing device 11D of the client terminal 11 (see FIG. 4B), or the like on the basis of the facial image of the first user UR1 captured by the photographing device 11D of the client terminal 11. The display data generating unit 12A of the virtual space interface device 12X may determine whether the first user UR1 has made an action of bringing the face of the first user UR1 closer to the photographing device 11D of the client terminal 11, whether the first user UR1 has made an action of bringing the face of the first user UR1 farther from the photographing device 11D of the client terminal 11, or the like on the basis of a distance between, for example, two feature points, on the facial image of the first user UR1 captured by the photographing device 11D of the client terminal 11 at a first timing and a distance between the feature points on the facial image of the first user UR1 captured by the photographing device 11D of the client terminal 11 at a second timing, as described in Patent Document 4.

Moreover, the display data generating unit 12A of the virtual space interface device 12X may use a known distance measurement technique using a camera to determine whether or not the first user UR1 has made an action of bringing the face of the first user UR1 closer to the photographing device 11D of the client terminal 11 (see FIG. 4A), whether or not the first user UR1 has made an action of bringing the face of the first user UR1 farther from the photographing device 11D of the client terminal 11 (see FIG. 4B), or the like on the basis of the facial image of the first user UR1 captured by the photographing device 11D of the client terminal 11.

In the example shown in FIG. 1, the display data generating unit 12A of the virtual space interface device 12X controls the enlargement and/or reduction of an image showing the situation in the virtual space displayed by the display device 11A of the client terminal 11-2 (an image displayed by the display device 11A of the client terminal 11-2 on the basis of the display data for the second client terminal) on the basis of the action of the second user UR2, who is photographed by the photographing device 11D of the client terminal 11-2, placing the hands of the second user UR2 over the eyes of the second user UR2 and the distance between the photographing device 11D of the client terminal 11-2 and the face of the second user UR2.

Likewise, the display data generating unit 12A of the virtual space interface device 12X controls the enlargement and/or reduction of an image showing the situation in the virtual space displayed by the display device 11A of the client terminal 11-3 (an image displayed by the display device 11A of the client terminal 11-3 on the basis of the display data for the third client terminal) on the basis of the action of the third user UR3 placing the hands of the third user UR3 over the eyes of the third user UR3 photographed by the photographing device 11D of the client terminal 11-3 and the distance between the photographing device 11D of the client terminal 11-3 and the face of the third user UR3, and controls the enlargement and/or reduction of an image showing the situation in the virtual space displayed by the display device 11A of the client terminal 11-4 (an image displayed by the display device 11A of the client terminal 11-4 on the basis of the display data for the fourth client terminal) on the basis of the action of the fourth user placing the hands of the fourth user over the eyes of the fourth user photographed by the photographing device 11D of the client terminal 11-4 and the distance between the photographing device 11D of the client terminal 11-4 and the face of the fourth user.

Figure 6A:
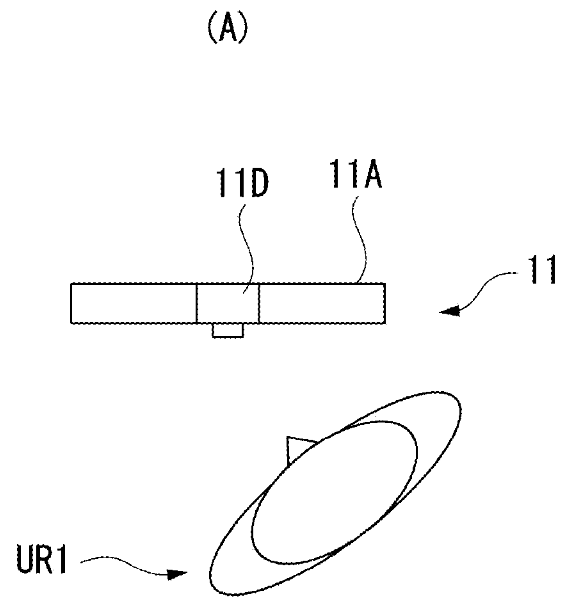
FIG. 6A A diagram showing an example in which the first user UR1 turns the face of the first user UR1 to the left of the photographing device 11D of the client terminal 11.
Figure 6B:
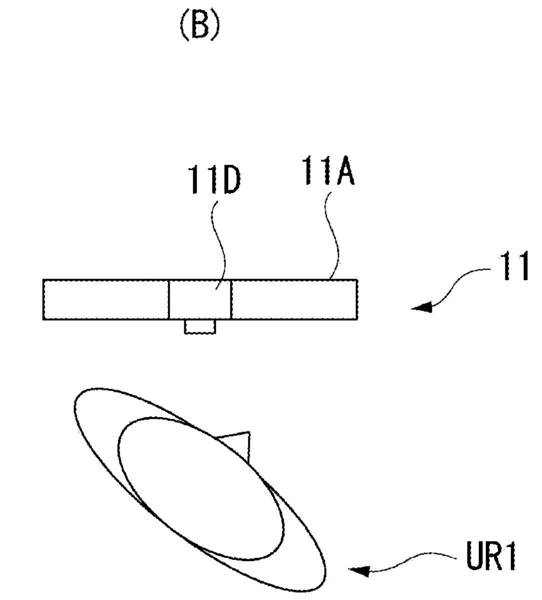
FIG. 6B A diagram showing an example in which the first user UR1 turns the face of the first user UR1 to the right of the photographing device 11D of the client terminal 11.
Figure 7A:
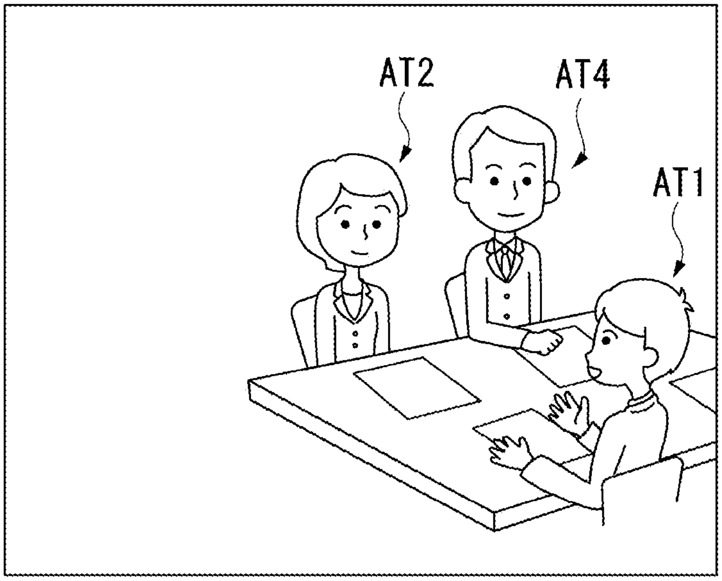
FIG. 7A A diagram showing an image obtained by moving a left part of an image showing a situation in the virtual space shown in FIG. 2 and displayed by the display device 11A of the client terminal 11 to the center.
Figure 7B:
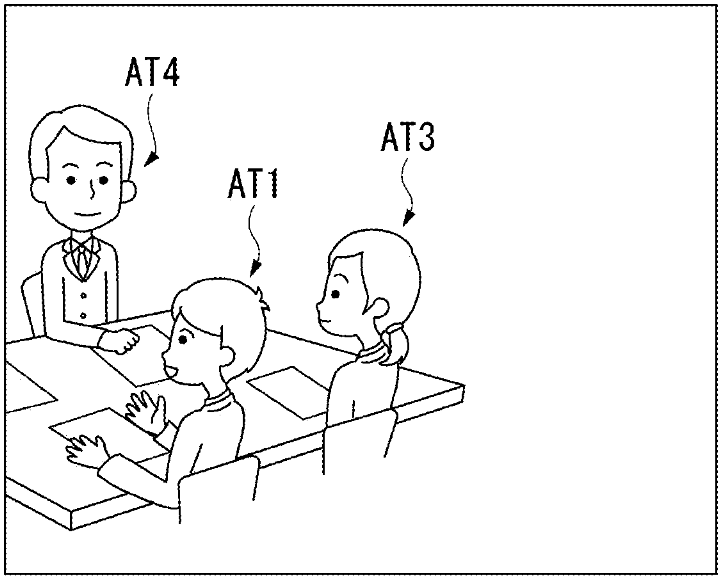
FIG. 7B A diagram showing an image obtained by moving a right part of an image showing a situation in the virtual space shown in FIG. 2 and displayed by the display device 11A of the client terminal 11 to the center.

FIG. 6 is an explanatory diagram of an example in which the first user UR1 changes an orientation of the face of the first user UR1 relative to the photographing device 11D of the client terminal 11. In detail, FIG. 6A is a diagram showing an example in which the first user UR1 turns the face of the first user UR1 to the left of the photographing device 11D of the client terminal 11 and FIG. 6B is a diagram showing an example in which the first user UR1 turns the face of the first user UR1 to the right of the photographing device 11D of the client terminal 11. FIG. 7 is an explanatory diagram of a second example of control performed by the display data generating unit 12A of the virtual space interface device 12X. In detail, FIG. 7A is a diagram showing an image obtained by moving a left part of an image showing a situation in the virtual space shown in FIG. 2 and displayed by the display device 11A of the client terminal 11 to the center and FIG. 7B is a diagram showing an image obtained by moving a right part of an image showing a situation in the virtual space shown in FIG. 2 and displayed by the display device 11A of the client terminal 11 to the center.

In the example shown in FIG. 1, the display data generating unit 12A of the virtual space interface device 12X controls a position corresponding to the image displayed by the display device 11A of the client terminal 11 as a position in the virtual space on the basis of an action of the first user UR1, who is photographed by the photographing device 11D of the client terminal 11, placing the hands of the first user UR1 over the eyes of the first user UR1 (see FIG. 3) and an orientation of the face of the first user UR1 relative to the photographing device 11D of the client terminal 11 (see FIG. 6).

Specifically, when the first user UR1 photographed by the photographing device 11D of the client terminal 11 makes an action of placing the hands of the first user UR1 over the eyes of the first user UR1 (see FIG. 3) and makes an action of turning the face of the first user UR1 to the left side of the photographing device 11D of the client terminal 11 (the left side of FIG. 6A) (see FIG. 6A), the display data generating unit 12A of the virtual space interface device 12X executes control for arranging the second avatar AT2 positioned on the left of the first avatar AT1 in the virtual space in the center of the image (see FIG. 7A) displayed by the display device 11A of the client terminal 11 in the horizontal direction. Furthermore, the display data generating unit 12A of the virtual space interface device 12X generates display data for the first client terminal for causing the display device 11A of the client terminal 11 to display the image shown in FIG. 7A (i.e., the image obtained by moving the left part of the image shown in FIG. 2 to the center).

Moreover, when the first user UR1 photographed by the photographing device 11D of the client terminal 11 makes an action of placing the hands of the first user UR1 over the eyes of the first user UR1 (see FIG. 3) and makes an action of turning the face to the right side (right side of FIG. 6B) of the photographing device 11D of the client terminal 11 (see FIG. 6B), the display data generating unit 12A of the virtual space interface device 12X executes control for arranging the third avatar AT3 positioned on the right of the first avatar AT1 in the virtual space in the center of the image (see FIG. 7B) displayed by the display device 11A of the client terminal 11 in the horizontal direction. Furthermore, the display data generating unit 12A of the virtual space interface device 12X generates display data for the first client terminal for causing the display device 11A of the client terminal 11 to display the image shown in FIG. 7B (i.e., the image obtained by moving the right part of the image shown in FIG. 2 to the center).

In the example shown in FIG. 1, the display data generating unit 12A of the virtual space interface device 12X, for example, uses a method similar to that described in paragraph 0054 of Patent Document 5 to determine whether or not the first user UR1 has made an action of turning the face of the first user UR1 to the left side of the photographing device 11D of the client terminal 11 (see FIG. 6A), whether or not the first user UR1 has made an action of turning the face of the first user UR1 to the right side of the photographing device 11D of the client terminal 11 (see FIG. 6B), or the like on the basis of the facial image of the first user UR1 captured by the photographing device 11D of the client terminal 11.

In another example, the display data generating unit 12A of the virtual space interface device 12X, for example, may determine whether or not the first user UR1 has turned the face of the first user UR1 to the side of the photographing device 11D of the client terminal 11 or the like on the basis of a rate of change in a distance between two feature points on the facial image of the first user UR1 captured by the photographing device 11D of the client terminal 11 at a first timing.

In the example shown in FIG. 1, the display data generating unit 12A of the virtual space interface device 12X controls a position corresponding to the image displayed by the display device 11A of the client terminal 11-2 as a position in the virtual space on the basis of the action of the second user UR2, who is photographed by the photographing device 11D of the client terminal 11-2, placing the hands of the second user UR2 over the eyes of the second user UR2 and the orientation of the face of the second user UR2 relative to the photographing device 11D of the client terminal 11-2. For example, when the second user UR2 photographed by the photographing device 11D of the client terminal 11-2 makes an action of placing the hands of the second user UR2 over the eyes of the second user UR2 and makes an action of turning the face of the second user UR2 to the left of the photographing device 11D of the client terminal 11-2 (an action of turning to the fourth avatar AT4 in the virtual space), the display data generating unit 12A of the virtual space interface device 12X executes control for arranging the fourth avatar AT4 positioned on the left of the second avatar AT2 in the virtual space in the center of the image displayed by the display device 11A of the client terminal 11-2 in the horizontal direction.

Furthermore, the display data generating unit 12A of the virtual space interface device 12X controls a position corresponding to the image displayed by the display device 11A of the client terminal 11-3 as a position in the virtual space on the basis of an action of the third user UR3, who is photographed by the photographing device 11D of the client terminal 11-3, placing the hands of the third user UR3 over the eyes of the third user UR3 and the orientation of the face of the third user UR3 relative to the photographing device 11D of the client terminal 11-3. For example, when the third user UR3 photographed by the photographing device 11D of the client terminal 11-3 makes an action of placing the hands of the third user UR3 over the eyes of the third user UR3 and makes an action of turning the face of the third user UR3 to the left of the photographing device 11D of the client terminal 11-3 (an action of turning to the first avatar AT1 in the virtual space), the display data generating unit 12A of the virtual space interface device 12X executes control for arranging the first avatar AT1 positioned on the left of the third avatar AT3 in the virtual space in the center of the image displayed by the display device 11A of the client terminal 11-3 in the horizontal direction.

Likewise, the display data generating unit 12A of the virtual space interface device 12X controls a position corresponding to the image displayed by the display device 11A of the client terminal 11-4 as a position in the virtual space on the basis of an action of the fourth user, who is photographed by the photographing device 11D of the client terminal 11-4, placing the fourth user's hands over the fourth user's eyes and an orientation of the fourth user's face relative to the photographing device 11D of the client terminal 11-4. For example, when the fourth user photographed by the photographing device 11D of the client terminal 11-4 makes an action of placing the fourth user's hands over the fourth user's eyes and makes an action of turning the fourth user's face to the left of the photographing device 11D of the client terminal 11-4 (an action of turning to the third avatar AT3 in the virtual space), the display data generating unit 12A of the virtual space interface device 12X executes control for arranging the third avatar AT3 positioned on the left of the fourth avatar AT4 in the virtual space in the center of the image displayed by the display device 11A of the client terminal 11-4 in the horizontal direction.

In the example shown in FIG. 1, the sound data generating unit 12B generates sound data for causing the sound output device 11B of each of the client terminals 11, 11-2, 11-3, and 11-4 to output a sound in the virtual space. In other words, the sound data generating unit 12B generates sound data for causing the sound output device 11B of the client terminal 11 to output a sound in the virtual space, sound data for causing the sound output device 11B of the client terminal 11-2 to output a sound in the virtual space, sound data for causing the sound output device 11B of the client terminal 11-3 to output a sound in the virtual space, and sound data for causing the sound output device 11B of the client terminal 11-4 to output a sound in the virtual space.

In more detail, the sound data generating unit 12B generates sound data for the first client terminal for causing the sound output device 11B of the client terminal 11 to output the sound uttered by the second user UR2, the sound uttered by the third user UR3, and the sound uttered by the fourth user as sounds in a virtual space on the basis of the sound uttered by the second user UR2 picked up by the sound pickup device 11C of the client terminal 11-2, the sound uttered by the third user UR3 picked up by the sound pickup device 11C of the client terminal 11-3, and the sound uttered by the fourth user picked up by the sound pickup device 11C of the client terminal 11-4.

Moreover, the sound data generating unit 12B generates sound data for the second client terminal for causing the sound output device 11B of the client terminal 11-2 to output the sound uttered by the first user UR1, the sound uttered by the third user UR3, and the sound uttered by the fourth user as sounds in a virtual space on the basis of the sound uttered by the first user UR1 picked up by the sound pickup device 11C of the client terminal 11, the sound uttered by the third user UR3 picked up by the sound pickup device 11C of the client terminal 11-3, and the sound uttered by the fourth user picked up by the sound pickup device 11C of the client terminal 11-4.

Furthermore, the sound data generating unit 12B generates sound data for the third client terminal for causing the sound output device 11B of the client terminal 11-3 to output the sound uttered by the first user UR1, the sound uttered by the second user UR2, and the sound uttered by the fourth user as sounds in a virtual space on the basis of the sound uttered by the first user UR1 picked up by the sound pickup device 11C of the client terminal 11, the sound uttered by the second user UR2 picked up by the sound pickup device 11C of the client terminal 11-2, and the sound uttered by the fourth user picked up by the sound pickup device 11C of the client terminal 11-4.

Moreover, the sound data generating unit 12B generates sound data for the fourth client terminal for causing the sound output device 11B of the client terminal 11-4 to output the sound uttered by the first user UR1, the sound uttered by the second user UR2, and the sound uttered by the third user UR3 as sounds in a virtual space on the basis of the sound uttered by the first user UR1 picked up by the sound pickup device 11C of the client terminal 11, the sound uttered by the second user UR2 picked up by the sound pickup device 11C of the client terminal 11-2, and the sound uttered by the third user UR3 picked up by the sound pickup device 11C of the client terminal 11-3.

In another example, the sound data generating unit 12B may generate sound data for causing the sound output devices 11B of the client terminals 11, 11-2, 11-3, and 11-4 to output, for example, background sounds, sounds set for objects other than avatars (e.g., action sounds or the like), and the like, different from the sounds generated by the first to four users UR1 to UR4, sound data for outputting (emitting), for example, background sounds, sounds set for objects other than avatars, and the like, different from the sounds generated by the first to fourth users UR1 to UR4, into the virtual space, and the like.

In the example shown in FIG. 1, the sound data generating unit 12B can generate sound data that is output into the virtual space (e.g., recorded in the virtual space interface device 12X) without causing the sound output device 11B of any of the client terminals 11, 11-2, 11-3, and 11-4 to output the sound on the basis of the sound uttered by the first user UR1 picked up by the sound pickup device 11C of the client terminal 11, the sound uttered by the second user UR2 picked up by the sound pickup device 11C of the client terminal 11, the sound uttered by the third user UR3 picked up by the sound pickup device 11C of the client terminal 11-3, the sound uttered by the fourth user UR4 picked up by the sound pickup device 11C of the client terminal 11-4, and the like.

Figure 8:
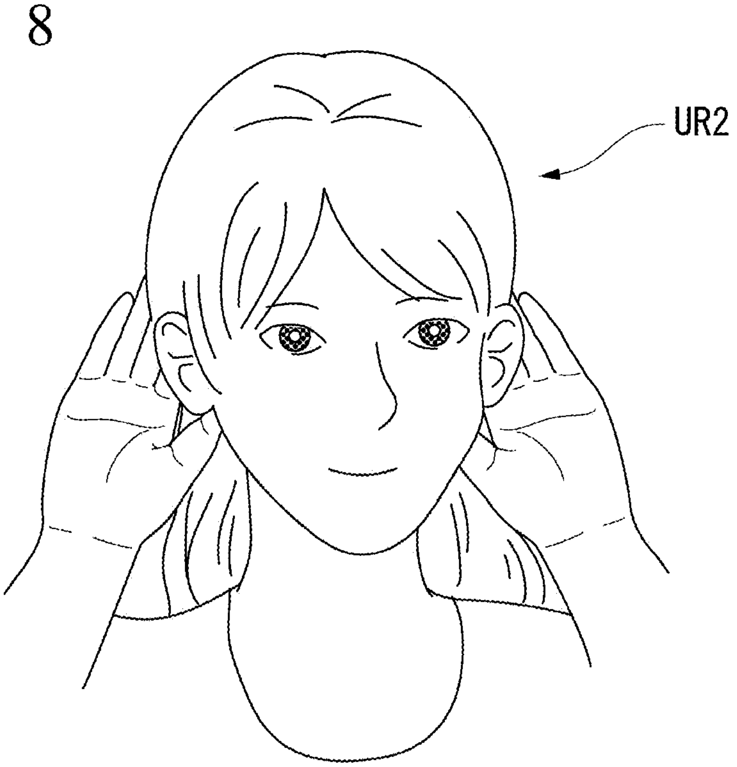
FIG. 8 An explanatory diagram of an example of an action of a second user UR2 placing the hands of the second user UR2 at the ears of the second user UR2.

FIG. 8 is an explanatory diagram of an example of the action of the second user UR2 placing the hands of the second user UR2 at the ears of the second user UR2.

In the example shown in FIG. 1, the sound data generating unit 12B of the virtual space interface device 12X determines whether or not the second user UR2 has made an action of placing the hands of the second user UR2 at the ears of the second user UR2 on the basis of the facial image of the second user UR2 captured by the photographing device 11D of the client terminal 11-2. The sound data generating unit 12B of the virtual space interface device 12X may determine whether or not the second user UR2 has made an action of placing the hands of the second user UR2 at the ears of the second user UR2 on the basis of the facial image of the second user UR2 captured by the photographing device 11D of the client terminal 11-2, for example, by using a conventional technique related to currently known gesture recognition as in a method described in paragraph 0041 of Patent Document 3. The "action of the second user UR2 placing the hands of the second user UR2 at the ears of the second user UR2" includes, for example, an action in which the second user UR2 causes the hands of the second user UR2 to be in contact with the ears of the second user UR2, an action in which the second user UR2 brings the hands of the second user UR2 closest to the ear parts of the entire face of the second user UR2 without causing the hands of the second user UR2 to be in contact with the ears of the second user UR2, or the like. In other words, an action in which the second user UR2 causes the hands of the second user UR2 not to be in contact with the face of the second user UR2 can also be the "action of the second user UR2 placing the hands of the second user UR2 at the ears of the second user UR2."

In the example shown in FIG. 1, the sound data generating unit 12B of the virtual space interface device 12X controls a volume of the sound in the virtual space output by the sound output device 11B of the client terminal 11 on the basis of the action of the first user UR1, who is photographed by the photographing device 11D of the client terminal 11, placing the hands of the first user UR1 at the ears of the first user UR1 and the distance between the photographing device 11D of the client terminal 11 and the face of the first user UR1 (see FIG. 4).

Specifically, when the first user UR1 photographed by the photographing device 11D of the client terminal 11 makes an action of placing the hands of the first user UR1 at the ears of the first user UR1 and makes an action of bringing the face of the first user UR1 closer to the photographing device 11D of the client terminal 11 (see FIG. 4A), the sound data generating unit 12B of the virtual space interface device 12X executes control for increasing a volume of the sound in the virtual space output by the sound output device 11B of the client terminal 11 and generates sound data for the first client terminal for causing the sound output device 11B of the client terminal 11 to output the sound in the virtual space with the increased volume.

Moreover, when the first user UR1 photographed by the photographing device 11D of the client terminal 11 makes an action of placing the hands of the first user UR1 at the ears of the first user UR1 and makes an action of bringing the face of the first user UR1 farther from the photographing device 11D of the client terminal 11 (see FIG. 4B), the sound data generating unit 12B of the virtual space interface device 12X executes control for decreasing the volume of the sound in the virtual space output by the sound output device 11B of the client terminal 11 and generates sound data for the first client terminal for causing the sound output device 11B of the client terminal 11 to output the sound in the virtual space with the decreased volume. For example, the sound data generating unit 12B of the virtual space interface device 12X may perform control so that the sound uttered by the fourth user corresponding to the fourth avatar AT4 farthest from the first avatar AT1 in the virtual space shown in FIG. 2 is not output by the sound output device 11B of the client terminal 11.

In the example shown in FIG. 1, the sound data generating unit 12B of the virtual space interface device 12X controls a volume of the sound in the virtual space output by the sound output device 11B of the client terminal 11-2 on the basis of an action of the second user UR2, who is photographed by the photographing device 11D of the client terminal 11-2, placing the hands of the second user UR2 at the ears of the second user UR2 (see FIG. 8) and a distance between the photographing device 11D of the client terminal 11-2 and the face of the second user UR2.

Specifically, when the second user UR2 photographed by the photographing device 11D of the client terminal 11-2 makes an action of placing the hands of the second user UR2 at the ears of the second user UR2 (see FIG. 8) and makes an action of bringing the face of the second user UR2 closer to the photographing device 11D of the client terminal 11-2, the sound data generating unit 12B of the virtual space interface device 12X executes control for increasing a volume of the sound in the virtual space output by the sound output device 11B of the client terminal 11-2 and generates sound data for the second client terminal for causing the sound output device 11B of the client terminal 11-2 to output the sound in the virtual space with the increased volume.

Moreover, when the second user UR2 photographed by the photographing device 11D of the client terminal 11-2 makes an action of placing the hands of the second user UR2 at the ears of the second user UR2 (see FIG. 8) and makes an action of bringing the face of the second user UR2 farther from the photographing device 11D of the client terminal 11-2, the sound data generating unit 12B of the virtual space interface device 12X executes control for decreasing the volume of the sound in the virtual space output by the sound output device 11B of the client terminal 11-2 and generates sound data for the second client terminal for causing the sound output device 11B of the client terminal 11-2 to output the sound in the virtual space with the decreased volume. For example, the sound data generating unit 12B of the virtual space interface device 12X may perform control so that the sound uttered by the third user UR3 corresponding to the third avatar AT3 farthest from the second avatar AT2 in the virtual space shown in FIG. 2 is not output by the sound output device 11B of the client terminal 11-2.

In the example shown in FIG. 1, the sound data generating unit 12B of the virtual space interface device 12X controls a volume of the sound in the virtual space output by the sound output device 11B of the client terminal 11-3 on the basis of the action of the third user UR3, who is photographed by the photographing device 11D of the client terminal 11-3, placing the hands of the third user UR3 at the ears of the third user UR3 and the distance between the photographing device 11D of the client terminal 11-3 and the face of the third user UR3. Moreover, the sound data generating unit 12B of the virtual space interface device 12X also controls a volume of the sound in the virtual space output by the sound output device 11B of the client terminal 11-4 on the basis of the action of the fourth user, who is photographed by the photographing device 11D of the client terminal 11-4, placing the fourth user's hands at the fourth user's ears and the distance between the photographing device 11D of the client terminal 11-4 and the face of the fourth user.

Moreover, in the example shown in FIG. 1, the sound data generating unit 12B of the virtual space interface device 12X controls a direction of arrival of the sound from the virtual space output by the sound output device 11B of the client terminal 11 on the basis of an action of the first user UR1, who is photographed by the photographing device 11D of the client terminal 11, placing the hands of the first user UR1 at the ears of the first user UR1 and an orientation of the face of the first user UR1 relative to the photographing device 11D of the client terminal 11 (see FIG. 6).

In the example shown in FIGS. 1 and 2, the sound data generating unit 12B of the virtual space interface device 12X controls volumes of the sound uttered by the second user UR2, the sound uttered by the third user UR3, and the sound uttered by the fourth user output as sounds in the virtual space by the sound output device 11B of the client terminal 11 on the basis of an action of the first user UR1, who is photographed by the photographing device 11D of the client terminal 11, placing the hands of the first user UR1 at the ears of the first user UR1, an orientation of the face of the first user UR1 relative to the photographing device 11D of the client terminal 11, and positions of the second avatar AT2, the third avatar AT3, and the fourth avatar AT4 in the virtual space so that a process of controlling the direction of arrival of the sound from the virtual space output by the sound output device 11B of the client terminal 11 is executed.

Specifically, when the first user UR1 photographed by the photographing device 11D of the client terminal 11 makes an action of placing the hands of the first user UR1 at the ears of the first user UR1 and makes an action of turning the face of the first user UR1 to the left side of the photographing device 11D of the client terminal 11 (the left side of FIG. 6A, the side of the second avatar AT2 in the virtual space shown in FIG. 2, or the opposite side of the third avatar AT3 in the virtual space shown in FIG. 2) (see FIG. 6A), the sound data generating unit 12B of the virtual space interface device 12X executes control for increasing a volume of the sound uttered by the second user UR2 output as a sound in the virtual space by the sound output device 11B of the client terminal 11 and decreasing a volume of the sound uttered by the third user UR3 output as a sound in the virtual space by the sound output device 11B of the client terminal 11. Furthermore, the sound data generating unit 12B of the virtual space interface device 12X generates sound data for the first client terminal for causing the sound output device 11B of the client terminal 11 to output the sound in the virtual space in which the volume of the sound uttered by the second user UR2 is increased and the volume of the sound uttered by the third user UR3 is decreased. For example, the sound data generating unit 12B of the virtual space interface device 12X may perform control so that the sound uttered by the third user UR3 corresponding to the third avatar AT3 in the virtual space shown in FIG. 2 is not output by the sound output device 11B of the client terminal 11.

Moreover, when the first user UR1 photographed by the photographing device 11D of the client terminal 11 makes an action of placing the hands of the first user UR1 at the ears of the first user UR1 and makes an action of turning the face of the first user UR1 to the right side of the photographing device 11D of the client terminal 11 (the right side of FIG. 6B, the side of the third avatar AT3 in the virtual space shown in FIG. 2, or the opposite side of the second avatar AT2 in the virtual space shown in FIG. 2) (see FIG. 6B), the sound data generating unit 12B of the virtual space interface device 12X executes control for increasing the volume of the sound uttered by the third user UR3 output as a sound in the virtual space by the sound output device 11B of the client terminal 11 and decreasing the volume of the sound uttered by the second user UR2 output as a sound in the virtual space by the sound output device 11B of the client terminal 11. Moreover, the sound data generating unit 12B of the virtual space interface device 12X generates sound data for the first client terminal for causing the sound output device 11B of the client terminal 11 to output the sound in the virtual space in which the volume of the sound uttered by the third user UR3 has been increased and the volume of the sound uttered by the second user UR2 has been decreased. For example, the sound data generating unit 12B of the virtual space interface device 12X may perform control so that the sound uttered by the second user UR2 corresponding to the second avatar AT2 in the virtual space shown in FIG. 2 is not output by the sound output device 11B of the client terminal 11.

That is, a direction in which the sound comes from the virtual space is controlled by increasing the volume of the sound coming from a direction in which the face of the first user UR1 is facing the first avatar AT1 in the virtual space and decreasing the volume of the sound coming from a direction opposite to the direction in which the face of the first user UR1 is facing.

Furthermore, in the example shown in FIG. 1, the sound data generating unit 12B of the virtual space interface device 12X controls a direction of arrival of the sound from the virtual space output by the sound output device 11B of the client terminal 11-2 on the basis of an action of the second user UR2, who is photographed by the photographing device 11D of the client terminal 11-2, placing the hands of the second user UR2 at the ears of the second user UR2 (see FIG. 8) and an orientation of the face of the second user UR2 relative to the photographing device 11D of the client terminal 11-2.

In the examples shown in FIGS. 1 and 2, the sound data generating unit 12B of the virtual space interface device 12X controls volumes of the sound uttered by the first user UR1, the sound uttered by the third user UR3, and the sound uttered by the fourth user output as sounds in the virtual space by the sound output device 11B of the client terminal 11-2, on the basis of an action of the second user UR2, who is photographed by the photographing device 11D of the client terminal 11-2, placing the hands of the second user UR2 at the ears of the second user UR2, an orientation of the face of the second user UR2 relative to the photographing device 11D of the client terminal 11-2, and positions of the first avatar AT1, the third avatar AT3, and the fourth avatar AT4 in the virtual space so that a process of controlling the direction of arrival of the sound from the virtual space output by the sound output device 11B of the client terminal 11-2 is executed.

Specifically, when the second user UR2 photographed by the photographing device 11D of the client terminal 11-2 makes an action of placing the hands of the second user UR2 at the ears of the second user UR2 (see FIG. 8) and makes an action of turning the face of the second user UR2 to the left side of the photographing device 11D of the client terminal 11-2 (the side of the fourth avatar AT4 in the virtual space shown in FIG. 2 and the opposite side of the first avatar AT1 in the virtual space shown in FIG. 2), the sound data generating unit 12B of the virtual space interface device 12X executes control for increasing the volume of the sound uttered by the fourth user output as a sound in the virtual space by the sound output device 11B of the client terminal 11-2 and decreasing the volume of the sound uttered by the first user UR1 output as a sound in the virtual space by the sound output device 11B of the client terminal 11-2. Furthermore, the sound data generating unit 12B of the virtual space interface device 12X generates sound data for the second client terminal for causing the sound output device 11B of the client terminal 11-2 to output the sound in the virtual space in which the volume of the sound uttered by the fourth user is increased and the volume of the sound uttered by the first user UR1 is decreased. For example, the sound data generating unit 12B of the virtual space interface device 12X may perform control so that the sound uttered by the first user UR1 corresponding to the first avatar AT1 in the virtual space shown in FIG. 2 is not output by the sound output device 11B of the client terminal 11-2.

Moreover, when the second user UR2 photographed by the photographing device 11D of the client terminal 11-2 makes an action of placing the hands of the second user UR2 at the ears of the second user UR2 (see FIG. 8) and makes an action of turning the face of the second user UR2 to the right side of the photographing device 11D of the client terminal 11-2 (the side of the first avatar AT1 in the virtual space shown in FIG. 2 or the opposite side of the fourth avatar AT4 in the virtual space shown in FIG. 2), the sound data generating unit 12B of the virtual space interface device 12X executes control for increasing the volume of the sound uttered by the first user UR1 output as a sound in the virtual space by the sound output device 11B of the client terminal 11-2 and decreasing the volume of the sound uttered by the fourth user output as a sound in the virtual space by the sound output device 11B of the client terminal 11-2. Furthermore, the sound data generating unit 12B of the virtual space interface device 12X generates sound data for the second client terminal for causing the sound output device 11B of the client terminal 11-2 to output the sound in the virtual space in which the volume of the sound uttered by the first user UR1 has been increased and the volume of the sound uttered by the fourth user has been decreased. For example, the sound data generating unit 12B of the virtual space interface device 12X may perform control so that the sound uttered by the fourth user corresponding to the fourth avatar AT4 in the virtual space shown in FIG. 2 is not output by the sound output device 11B of the client terminal 11-2.

In the example shown in FIG. 1, the sound data generating unit 12B of the virtual space interface device 12X controls a direction of arrival of the sound from the virtual space output by the sound output device 11B of the client terminal 11-3 on the basis of an action of the third user UR3, who is photographed by the photographing device 11D of the client terminal 11-3, placing the hands of the third user UR3 at the ears of the third user UR3 and an orientation of the face of the third user UR3 relative to the photographing device 11D of the client terminal 11-3. In the example shown in FIGS. 1 and 2, the sound data generating unit 12B of the virtual space interface device 12X controls volumes of the sound uttered by the first user UR1, the sound uttered by the second user UR2, and the sound uttered by the fourth user output as sounds in the virtual space by the sound output device 11B of the client terminal 11-3 on the basis of an action of the third user UR3, who is photographed by the photographing device 11D of the client terminal 11-3, placing the hands of the third user UR3 at the ears of the third user UR3, an orientation of the face of the third user UR3 relative to the photographing device 11D of the client terminal 11-3, and positions of the first avatar AT1, the second avatar AT2, and the fourth avatar AT4 in the virtual space so that a process of controlling the direction of arrival of the sound from the virtual space output by the sound output device 11B of the client terminal 11-3 is executed. Moreover, in the example shown in FIG. 1, the sound data generating unit 12B of the virtual space interface device 12X controls a direction of arrival of the sound from the virtual space output by the sound output device 11B of the client terminal 11-4 on the basis of an action of the fourth user, who is photographed by the photographing device 11D of the client terminal 11-4, placing the fourth user's hands at the fourth user's ears and an orientation of the fourth user's face relative to the photographing device 11D of the client terminal 11-4. In the example shown in FIGS. 1 and 2, the sound data generating unit 12B of the virtual space interface device 12X controls volumes of the sound uttered by the first user UR1, the sound uttered by the second user UR2, and the sound uttered by the third user UR3 output as sounds in the virtual space by the sound output device 11B of the client terminal 11-4 on the basis of an action of the fourth user, who is photographed by the photographing device 11D of the client terminal 11-4, placing the fourth user's hands at the fourth user's ears, an orientation of the fourth user's face relative to the photographing device 11D of the client terminal 11-4, and positions of the first avatar AT1, the second avatar AT2, and the third avatar AT3 in the virtual space so that a process of controlling the direction of arrival of the sound from the virtual space output by the sound output device 11B of the client terminal 11-4 is executed.

Figure 9:
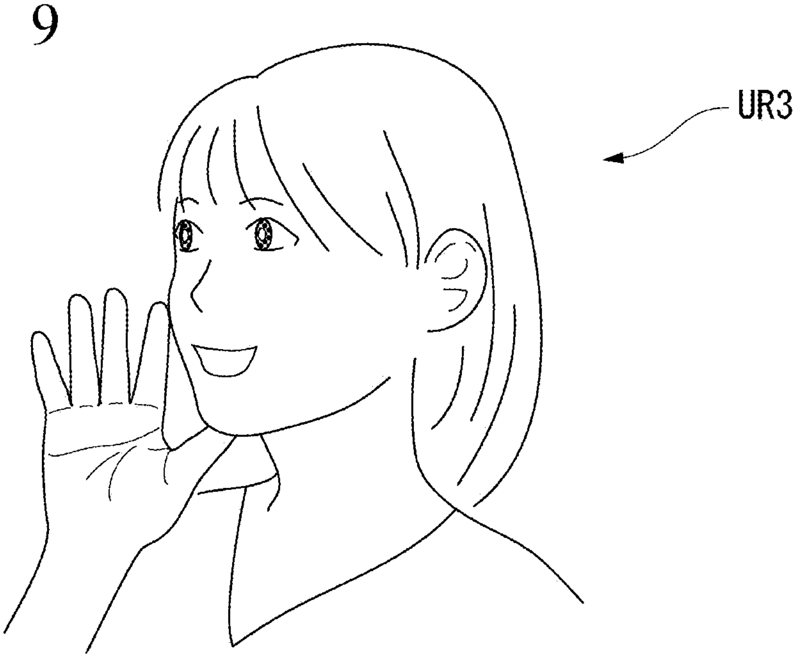
FIG. 9 An explanatory diagram of an example of an action of a third user UR3 placing the hand of the third user UR3 at the mouth of the third user UR3.

FIG. 9 is an explanatory diagram of an example of the action of the third user UR3 placing the hand of the third user UR3 at the mouth of the third user UR3.

In the example shown in FIG. 1, the sound data generating unit 12B of the virtual space interface device 12X determines whether or not the third user UR3 has performed an action of placing the hand of the third user UR3 at the mouth of the third user UR3 on the basis of a facial image of the third user UR3 captured by the photographing device 11D of the client terminal 11-3. The sound data generating unit 12B of the virtual space interface device 12X may determine whether or not the third user UR3 has made an action of placing the hand of the third user UR3 at the mouth of the third user UR3 on the basis of a facial image of the third user UR3 captured by the photographing device 11D of the client terminal 11-3, for example, by using a conventional technique related to currently known gesture recognition as in the method described in paragraph 0041 of Patent Document 3. The "action of the third user UR3 placing the hand of the third user UR3 at the mouth of the third user UR3" includes, for example, an action of the third user UR3 for causing the hands of the third user UR3 to be in contact with the mouth of the third user UR3, an action of the third user UR3 for bringing the hand of the third user UR3 closest to the mouth area of the entire face of the third user UR3 without causing the hand of the third user UR3 to be in contact with the mouth of the third user UR3, and the like. In other words, an action of the third user UR3 for causing the hand not to be in contact with the face of the third user UR3 can also be an "action of the third user UR3 placing the hand of the third user UR3 at the mouth of the third user UR3."

In the example shown in FIG. 1, the sound data generating unit 12B of the virtual space interface device 12X controls a volume of the sound uttered by the first user UR1, which is picked up by the sound pickup device 11C of the client terminal 11 and output into the virtual space, on the basis of an action of the first user UR1, who is photographed by the photographing device 11D of the client terminal 11, placing the hand at the mouth of the first user UR1 and a distance between the photographing device 11D of the client terminal 11 and the face of the first user UR1 (see FIG. 4). The sound uttered by the first user UR1 output into the virtual space may be output by the sound output device 11B of each of the client terminals 11-2, 11-3, and 11-4 or may not be output by the sound output device 11B of each of the client terminals 11-2, 11-3, and 11-4 (in this case, the sound uttered by the first user UR1, for example, may be recorded in the virtual space interface device 12X).

For example, when the first user UR1 photographed by the photographing device 11D of the client terminal 11 makes an action of placing the hand of the first user UR1 at the mouth of the first user UR1 and makes an action of bringing the face of the first user UR1 closer to the photographing device 11D of the client terminal 11 (see FIG. 4A), the sound data generating unit 12B of the virtual space interface device 12X executes control for increasing the volume of the sound uttered by the first user UR1 that is output into the virtual space and output by the sound output device 11B of the client terminal 11-2, generates sound data for the second client terminal for causing the sound output device 11B of the client terminal 11-2 to output the sound in the virtual space with the increased volume, executes control for increasing the volume of the sound uttered by the first user UR1 that is output into the virtual space and output by the sound output device 11B of the client terminal 11-3, generates sound data for the third client terminal for causing the sound output device 11B of the client terminal 11-3 to output the sound in the virtual space with the increased volume, executes control for increasing the volume of the sound uttered by the first user UR1 that is output into the virtual space and output by the sound output device 11B of the client terminal 11-4, and generates sound data for the fourth client terminal for causing the sound output device 11B of the client terminal 11-4 to output the sound in the virtual space with the increased volume.

In other words, the sound data generating unit 12B of the virtual space interface device 12X executes control for increasing a volume at which the sound uttered by the first user UR1 that is picked up by the sound pickup device 11C of the client terminal 11 is emitted (output) into the virtual space.

Moreover, when the first user UR1 photographed by the photographing device 11D of the client terminal 11 makes an action of placing the hand of the first user UR1 at the mouth of the first user UR1 and makes an action of bringing the face of the first user UR1 farther from the photographing device 11D of the client terminal 11 (see FIG. 4B), the sound data generating unit 12B of the virtual space interface device 12X executes control for decreasing the volume of the sound uttered by the first user UR1 that is output into the virtual space and output by the sound output device 11B of the client terminal 11-2, generates sound data for the second client terminal for causing the sound output device 11B of the client terminal 11-2 to output the sound in the virtual space with the decreased volume, executes control for decreasing the volume of the sound uttered by the first user UR1 that is output into the virtual space and output by the sound output device 11B of the client terminal 11-3, generates sound data for the third client terminal for causing the sound output device 11B of the client terminal 11-3 to output the sound in the virtual space with the decreased volume, executes control for decreasing the volume of the sound uttered by the first user UR1 that is output into the virtual space and output by the sound output device 11B of the client terminal 11-4, and generates sound data for the fourth client terminal for causing the sound output device 11B of the client terminal 11-4 to output the sound in the virtual space with the decreased volume.

In other words, the sound data generating unit 12B of the virtual space interface device 12X executes control for decreasing a volume at which the sound uttered by the first user UR1 that is picked up by the sound pickup device 11C of the client terminal 11 is emitted (output) into the virtual space.

In the example shown in FIG. 1, as described above, when the first user UR1 makes an action of placing the hand of the first user UR1 at the mouth of the first user UR1 and bringing the face of the first user UR1 farther from the photographing device 11D of the client terminal 11 (see FIG. 4B), the sound data generating unit 12B executes control for decreasing the volume of the sound uttered by the first user UR1 output into the virtual space and output by the sound output device 11B of the client terminal 11-2 or the like. However, in another example, when the first user UR1 covers the mouth of the first user UR1 with the hand of the first user UR1, the sound data generating unit 12B may execute control for decreasing the volume of the sound uttered by the first user UR1 output into the virtual space and output by the sound output device 11B of the client terminal 11-2 or the like to zero.

In the example shown in FIG. 1, the sound data generating unit 12B of the virtual space interface device 12X controls a volume of the sound uttered by the second user UR2, which is picked up by the sound pickup device 11C of the client terminal 11-2 and output into the virtual space, on the basis of an action of the second user UR2, who is photographed by the photographing device 11D of the client terminal 11-2, placing the hand of the second user UR2 at the mouth of the second user UR2 and a distance between the photographing device 11D of the client terminal 11-2 and the face of the second user UR2. The sound uttered by the second user UR2 and output into the virtual space may be output by the sound output device 11B of each of the client terminals 11, 11-3, and 11-4 or may not be output by the sound output device 11B of each of the client terminals 11, 11-3, and 11-4 (in this case, the sound uttered by the second user UR2, for example, may be recorded in the virtual space interface device 12X).

For example, when the second user UR2 photographed by the photographing device 11D of the client terminal 11-2 makes an action of placing the hand of the second user UR2 at the mouth of the second user UR2 and makes an action of bringing the face of the second user UR2 closer to the photographing device 11D of the client terminal 11-2, the sound data generating unit 12B of the virtual space interface device 12X executes control for increasing the volume of the sound uttered by the second user UR2 that is output into the virtual space and output by the sound output device 11B of the client terminal 11, generates sound data for the first client terminal for causing the sound output device 11B of the client terminal 11 to output the sound in the virtual space with the increased volume, executes control for increasing the volume of the sound uttered by the second user UR2 that is output into the virtual space and output by the sound output device 11B of the client terminal 11-3, generates sound data for the third client terminal for causing the sound output device 11B of the client terminal 11-3 to output the sound in the virtual space with the increased volume, executes control for increasing the volume of the sound uttered by the second user UR2 that is output into the virtual space and output by the sound output device 11B of the client terminal 11-4, and generates sound data for the fourth client terminal for causing the sound output device 11B of the client terminal 11-4 to output the sound in the virtual space with the increased volume.

In other words, the sound data generating unit 12B of the virtual space interface device 12X executes control for increasing a volume at which the sound uttered by the second user UR2 that is picked up by the sound pickup device 11C of the client terminal 11-2 is emitted (output) into the virtual space.

Moreover, when the second user UR2 photographed by the photographing device 11D of the client terminal 11-2 makes an action of placing the hand of the second user UR2 at the mouth of the second user UR2 and makes an action of bringing the face of the second user UR2 farther from the photographing device 11D of the client terminal 11-2, the sound data generating unit 12B of the virtual space interface device 12X executes control for decreasing the volume of the sound uttered by the second user UR2 that is output into the virtual space and output by the sound output device 11B of the client terminal 11, generates sound data for the first client terminal for causing the sound output device 11B of the client terminal 11 to output the sound in the virtual space with the decreased volume, executes control for decreasing the volume of the sound uttered by the second user UR2 that is output into the virtual space and output by the sound output device 11B of the client terminal 11-3, generates sound data for the third client terminal for causing the sound output device 11B of the client terminal 11-3 to output the sound in the virtual space with the decreased volume, executes control for decreasing the volume of the sound uttered by the second user UR2 that is output into the virtual space and output by the sound output device 11B of the client terminal 11-4, and generates sound data for the fourth client terminal for causing the sound output device 11B of the client terminal 11-4 to output the sound in the virtual space with the decreased volume.

In other words, the sound data generating unit 12B of the virtual space interface device 12X executes control for decreasing a volume at which the sound uttered by the second user UR2 that is picked up by the sound pickup device 11C of the client terminal 11-2 is emitted (output) into the virtual space.

In the example shown in FIG. 1, for example, the sound data generating unit 12B of the virtual space interface device 12X controls a volume of the sound uttered by the third user UR3, which is output into the virtual space and output by the sound output device 11B of each of the client terminals 11, 11-2, and 11-4 on the basis of an action of the third user UR3, who is photographed by the photographing device 11D of the client terminal 11-3, placing the hand of the third user UR3 at the mouth of the third user UR3 (see FIG. 9), and a distance between the photographing device 11D of the client terminal 11-3 and the face of the third user UR3. Also, for example, the sound data generating unit 12B of the virtual space interface device 12X controls a volume of the sound uttered by the fourth user, which is output into the virtual space and output by the sound output device 11B of each of the client terminals 11, 11-2, and 11-3 on the basis of an action of the fourth user, who is photographed by the photographing device 11D of the client terminal 11-4, placing the hand of the fourth user at the mouth of the fourth user and a distance between the photographing device 11D of the client terminal 11-4 and the face of the fourth user.

Moreover, in the example shown in FIG. 1, for example, the sound data generating unit 12B of the virtual space interface device 12X controls a direction in which a sound uttered by the first user UR1 (a sound picked up by the sound pickup device 11C of the client terminal 11) is output to the virtual space on the basis of an action of the first user UR1, who is photographed by the photographing device 11D of the client terminal 11, placing the hand of the first user UR1 at the mouth of the first user UR1 and an orientation of the face of the first user UR1 relative to the photographing device 11D of the client terminal 11 (see FIG. 6).

In the example shown in FIGS. 1 and 2, the sound data generating unit 12B of the virtual space interface device 12X controls a volume of the sound uttered by the first user UR1 that is output into the virtual space and output by the sound output device 11B of the client terminal 11-2, controls a volume of the sound uttered by the first user UR1 that is output into the virtual space and output by the sound output device 11B of the client terminal 11-3, and controls a volume of the sound uttered by the first user UR1 that is output into the virtual space and output by the sound output device 11B of the client terminal 11-4, on the basis of an action of the first user UR1, who is photographed by the photographing device 11D of the client terminal 11, placing the hand of the first user UR1 at the mouth of the first user UR1, an orientation of the face of the first user UR1 relative to the photographing device 11D of the client terminal 11, and positions of the second avatar AT2, the third avatar AT3, and the fourth avatar AT4 in the virtual space.

Specifically, when the first user UR1 photographed by the photographing device 11D of the client terminal 11 makes an action of placing the hand of the first user UR1 at the mouth of the first user UR1 and makes an action of turning the face of the first user UR1 to the left side of the photographing device 11D of the client terminal 11 (the left side of FIG. 6A, the side of the second avatar AT2 in the virtual space shown in FIG. 2, or the opposite side of the third avatar AT3 in the virtual space shown in FIG. 2) (see FIG. 6A), the sound data generating unit 12B of the virtual space interface device 12X increases a volume of the sound uttered by the first user UR1 that is output into the virtual space and output by the sound output device 11B of the client terminal 11-2 and generates sound data for the second client terminal for causing the sound output device 11B of the client terminal 11-2 to output the sound in the virtual space in which the volume of the sound uttered by the first user UR1 has been increased. Moreover, the sound data generating unit 12B of the virtual space interface device 12X decreases the volume of the sound uttered by the first user UR1, which is output into the virtual space and output by the sound output device 11B of the client terminal 11-3 and generates sound data for the third client terminal for causing the sound output device 11B of the client terminal 11-3 to output the sound in the virtual space in which the volume of the sound uttered by the first user UR1 has been decreased. Furthermore, for example, the sound data generating unit 12B of the virtual space interface device 12X generates sound data for the fourth client terminal for causing the sound output device 11B of the client terminal 11-4 to output the sound in the virtual space in which the volume of the sound uttered by the first user UR1 is not changed without changing the volume of the sound uttered by the first user UR1, which is output into the virtual space and output by the sound output device 11B of the client terminal 11-4.

That is, the direction of the sound is controlled by increasing the volume of the sound output by the sound output device 11B of the client terminal (e.g., the client terminal 11-2) of the user (e.g., the second user UR2) corresponding to the avatar (e.g., the second avatar AT2) located in the direction in which the face of the first user UR1 is facing relative to the first avatar AT1 in the virtual space and decreasing the volume of the sound output by the sound output device 11B of the client terminal (the client terminal 11-3) of the user (e.g., the third user UR3) corresponding to the avatar (e.g., the third avatar AT3) located in a direction opposite to the direction in which the face of the first user UR1 is facing.

In other words, the sound data generating unit 12B of the virtual space interface device 12X executes a process of controlling a direction in which the sound uttered by the first user UR1 and picked up by the sound pickup device 11C of the client terminal 11 is emitted (output) into the virtual space.

In the example shown in FIG. 1, as described above, when the first user UR1 makes an action of placing the hand of the first user UR1 at the mouth of the first user UR1 and turning the face of the first user UR1 to the left side of the photographing device 11D of the client terminal 11 (an opposite side of the third avatar AT3 in the virtual space shown in FIG. 2), the sound data generating unit 12B executes control for decreasing the volume of the sound uttered by the first user UR1 output by the sound output device 11B of the client terminal 11-3. However, in another example, when the first user UR1 covers the mouth of the first user UR1 with the hand of the first user UR1, the sound data generating unit 12B may execute control for decreasing the volume of the sound uttered by the first user UR1 output by the sound output device 11B of the client terminal 11-3 or the like to zero.

Moreover, for example, when the first user UR1 photographed by the photographing device 11D of the client terminal 11 makes an action of placing the hand of the first user UR1 at the mouth of the first user UR1 and makes an action of turning the face of the first user UR1 to the right side of the photographing device 11D of the client terminal 11 (the right side of FIG. 6B, the side of the third avatar AT3 in the virtual space shown in FIG. 2, or the opposite side of the second avatar AT2 in the virtual space shown in FIG. 2) (see FIG. 6B), the sound data generating unit 12B of the virtual space interface device 12X decreases a volume of the sound uttered by the first user UR1, which is output into the virtual space and output by the sound output device 11B of the client terminal 11-2, and generates sound data for the second client terminal for causing the sound output device 11B of the client terminal 11-2 to output the sound in the virtual space in which the volume of the sound uttered by the first user UR1 has been decreased. Moreover, the sound data generating unit 12B of the virtual space interface device 12X increases the volume of the sound uttered by the first user UR1, which is output into the virtual space and output by the sound output device 11B of the client terminal 11-3, and generates sound data for the third client terminal for causing the sound output device 11B of the client terminal 11-3 to output the sound in the virtual space in which the volume of the sound uttered by the first user UR1 has been increased. Furthermore, for example, the sound data generating unit 12B of the virtual space interface device 12X generates sound data for the fourth client terminal for causing the sound output device 11B of the client terminal 11-4 to output the sound in the virtual space in which the volume of the sound uttered by the first user UR1 is not changed without changing the volume of the sound uttered by the first user UR1, which is output into the virtual space and output by the sound output device 11B of the client terminal 11-4.

In other words, the sound data generating unit 12B of the virtual space interface device 12X executes a process of controlling a direction in which the sound uttered by the first user UR1 and picked up by the sound pickup device 11C of the client terminal 11 is emitted (output) into the virtual space.

Moreover, in the example shown in FIG. 1, for example, the sound data generating unit 12B of the virtual space interface device 12X controls a direction in which the sound uttered by the second user UR2 (the sound picked up by the sound pickup device 11C of the client terminal 11-2) is output into the virtual space on the basis of an action of the second user UR2, who is photographed by the photographing device 11D of the client terminal 11-2, placing the hand of the second user UR2 at the mouth of the second user UR2 and an orientation of the face of the second user UR2 relative to the photographing device 11D of the client terminal 11-2.

In the example shown in FIGS. 1 and 2, the sound data generating unit 12B of the virtual space interface device 12X controls a volume of the sound uttered by the second user UR2 that is output into the virtual space and output by the sound output device 11B of the client terminal 11, controls a volume of the sound uttered by the second user UR2 that is output into the virtual space and output by the sound output device 11B of the client terminal 11-3, and controls a volume of the sound uttered by the second user UR2 that is output into the virtual space and output by the sound output device 11B of the client terminal 11-4, on the basis of an action of the second user UR2, who is photographed by the photographing device 11D of the client terminal 11-2, placing the hand of the second user UR2 at the mouth of the second user UR2, an orientation of the face of the second user UR2 relative to the photographing device 11D of the client terminal 11-2, and positions of the first avatar AT1, the third avatar AT3, and the fourth avatar AT4 in the virtual space.

Specifically, when the second user UR2 photographed by the photographing device 11D of the client terminal 11-2 makes an action of placing the hand of the second user UR2 at the mouth of the second user UR2 and makes an action of turning the face of the second user UR2 to the left side of the photographing device 11D of the client terminal 11-2 (the side of the fourth avatar AT4 in the virtual space shown in FIG. 2 or the opposite side of the first avatar AT1 in the virtual space shown in FIG. 2), the sound data generating unit 12B of the virtual space interface device 12X increases a volume of the sound uttered by the second user UR2, which is output into the virtual space and output by the sound output device 11B of the client terminal 11-4, and generates sound data for the fourth client terminal for causing the sound output device 11B of the client terminal 11-4 to output the sound in the virtual space in which the volume of the sound uttered by the second user UR2 has been increased. Moreover, the sound data generating unit 12B of the virtual space interface device 12X decreases a volume of the sound uttered by the second user UR2, which is output into the virtual space and output by the sound output device 11B of the client terminal 11 and generates sound data for the first client terminal for causing the sound output device 11B of the client terminal 11 to output the sound in the virtual space in which the volume of the sound uttered by the second user UR2 has been decreased. Furthermore, for example, the sound data generating unit 12B of the virtual space interface device 12X generates sound data for the third client terminal for causing the sound output device 11B of the client terminal 11-3 to output the sound in the virtual space in which the volume of the sound uttered by the second user UR2 is not changed without changing the volume of the sound uttered by the second user UR2, output into the virtual space and output by the sound output device 11B of the client terminal 11-3.

That is, the direction of the sound is controlled by increasing a volume of the sound output by the sound output device 11B of the client terminal (e.g., the client terminal 11-4) of the user (e.g., the fourth user UR4) corresponding to the avatar (e.g., the fourth avatar AT4) located in a direction in which the face of the second user UR2 is turned with respect to the second avatar AT2 in the virtual space and decreasing a volume of the sound output by the sound output device 11B of the client terminal (the client terminal 11) of the user (e.g., the first user UR1) corresponding to the avatar (e.g., the first avatar AT1) located in a direction opposite to the direction in which the face of the second user UR2 is turned.

In other words, the sound data generating unit 12B of the virtual space interface device 12X executes a process of controlling a direction in which the sound uttered by the second user UR2 and picked up by the sound pickup device 11C of the client terminal 11-2 is emitted (output) into the virtual space.

Moreover, when the second user UR2 photographed by the photographing device 11D of the client terminal 11-2 makes an action of placing the hand of the second user UR2 at the mouth of the second user UR2 and makes an action of turning the face of the second user UR2 to the right side of the photographing device 11D of the client terminal 11-2 (the side of the first avatar AT1 in the virtual space shown in FIG. 2 or an opposite side of the fourth avatar AT4 in the virtual space shown in FIG. 2), the sound data generating unit 12B of the virtual space interface device 12X decreases a volume of the sound uttered by the second user UR2, which is output into the virtual space and output by the sound output device 11B of the client terminal 11-4 and generates sound data for the fourth client terminal for causing the sound output device 11B of the client terminal 11-4 to output the sound in the virtual space in which the volume of the sound uttered by the second user UR2 has been decreased.

Moreover, the sound data generating unit 12B of the virtual space interface device 12X increases a volume of the sound uttered by the second user UR2, which is output into the virtual space and output by the sound output device 11B of the client terminal 11 and generates sound data for the first client terminal for causing the sound output device 11B of the client terminal 11 to output the sound in the virtual space in which the volume of the sound uttered by the second user UR2 has been increased. Furthermore, the sound data generating unit 12B of the virtual space interface device 12X generates sound data for the third client terminal for causing the sound output device 11B of the client terminal 11-3 to output the sound in the virtual space in which the volume of the sound uttered by the second user UR2 is not changed without changing the volume of the sound uttered by the second user UR2, which is output into the virtual space and output by the sound output device 11B of the client terminal 11-3.

In other words, the sound data generating unit 12B of the virtual space interface device 12X executes a process of controlling the direction in which the sound uttered by the second user UR2, which is picked up by the sound pickup device 11C of the client terminal 11-2, is emitted (output) into the virtual space.

In the example shown in FIGS. 1 and 2, for example, the sound data generating unit 12B of the virtual space interface device 12X controls the volume of the sound uttered by the third user UR3, which is output into the virtual space and output by the sound output device 11B of the client terminal 11, controls the volume of the sound uttered by the third user UR3, which is output into the virtual space and output by the sound output device 11B of the client terminal 11-2, and controls the volume of the sound uttered by the third user UR3, which is output into the virtual space and output by the sound output device 11B of the client terminal 11-4, on the basis of an action of the third user UR3, who is photographed by the photographing device 11D of the client terminal 11-3, placing the hand of the third user UR3 at the mouth of the third user UR3 (see FIG. 9), an orientation of the face of the third user UR3 relative to the photographing device 11D of the client terminal 11-3, and positions of the first avatar AT1, the second avatar AT2, and the fourth avatar AT4 in the virtual space. Moreover, for example, the sound data generating unit 12B of the virtual space interface device 12X controls a volume of the sound uttered by the fourth user, which is output into the virtual space and output by the sound output device 11B of the client terminal 11, controls a volume of the sound uttered by the fourth user, which is output into the virtual space and output by the sound output device 11B of the client terminal 11-2, and controls a volume of the sound uttered by the fourth user, which is output into the virtual space and output by the sound output device 11B of the client terminal 11-3, on the basis of an action of the fourth user, who is photographed by the photographing device 11D of the client terminal 11-4, placing the fourth user's hand at the fourth user's mouth, an orientation of the fourth user's face relative to the photographing device 11D of the client terminal 11-4, and positions of the first avatar AT1, the second avatar AT2, and the third avatar AT3 in the virtual space.

As described above, in the example shown in FIG. 1, the display data generating unit 12A and the sound data generating unit 12B of the virtual space interface device 12X control at least one item of the display data for the first client terminal for causing the display device 11A of the client terminal 11 to display an image showing the situation in the virtual space, display data for the second client terminal for causing the display device 11A of the client terminal 11-2 to display an image showing the situation in the virtual space, display data for the third client terminal for causing the display device 11A of the client terminal 11-3 to display an image showing the situation in the virtual space, the display data for the fourth client terminal for causing the display device 11A of the client terminal 11-4 to display an image showing the situation in the virtual space, the sound data for the first client terminal for causing the sound output device 11B of the client terminal 11 to output the sound in the virtual space, the sound data for the second client terminal for causing the sound output device 11B of the client terminal 11-2 to output the sound in the virtual space, the sound data for the third client terminal for causing the sound output device 11B of the client terminal 11-3 to output the sound in the virtual space, and the sound data for the fourth client terminal for causing the sound output device 11B of the client terminal 11-4 to output the sound in the virtual space as a control target, on the basis of a gesture of positioning the hands at the face area of the first user UR1 photographed by the photographing device 11D of the client terminal 11 (an action of placing the hands over the eyes, an action of placing the hands at the ears, or an action of placing the hand at the mouth), a positional relationship between the photographing device 11D of the client terminal 11 and the face of the first user UR1 (approaching, moving away, facing the left of the photographing device 11D of the client terminal 11, or facing the right of the photographing device 11D of the client terminal 11), a gesture of positioning the hands at the face area of the second user UR2 photographed by the photographing device 11D of the client terminal 11-2 (an action of placing the hands over the eyes, an action of placing the hands at the ears, or an action of placing the hand at the mouth), a positional relationship between the photographing device 11D of the client terminal 11-2 and the face of the second user UR2 (approaching, moving away, facing the left of the photographing device 11D of the client terminal 11-2, or facing the right of the photographing device 11D of the client terminal 11-2), a gesture of positioning the hands at the face area of the third user UR3 photographed by the photographing device 11D of the client terminal 11-3 (an action of placing the hands over the eyes, an action of placing the hands at the ears, or an action of placing the hand at the mouth), a positional relationship between the photographing device 11D of the client terminal 11-3 and the face of the third user UR3 (approaching, moving away, facing the left of the photographing device 11D of the client terminal 11-3, or facing the right of the photographing device 11D of the client terminal 11-3), a gesture of positioning the hands at the face area of the fourth user photographed by the photographing device 11D of the client terminal 11-4 (an action of placing the hands over the eyes, an action of placing the hands at the ears, or an action of placing the hand at the mouth), and a positional relationship between the photographing device 11D of the client terminal 11-4 and the face of the fourth user (approaching, moving away, facing the left of the photographing device 11D of the client terminal 11-4, or facing the right of the photographing device 11D of the client terminal 11-4).

Furthermore, the display data generating unit 12A and the sound data generating unit 12B differentiate the control target (at least one item of the display data for the first to fourth client terminals and the sound data for the first to fourth client terminals) in accordance with a part (the eye, ear, or mouth) of the face area where the first user UR1 positions the hand, a part (the eye, ear, or mouth) of the face area where the second user UR2 positions the hand, a part (the eye, ear, or mouth) of the face area where the third user UR3 positions the hand, and a part (the eye, ear, or mouth) of the face area where the fourth user positions the hand.

Figure 10:
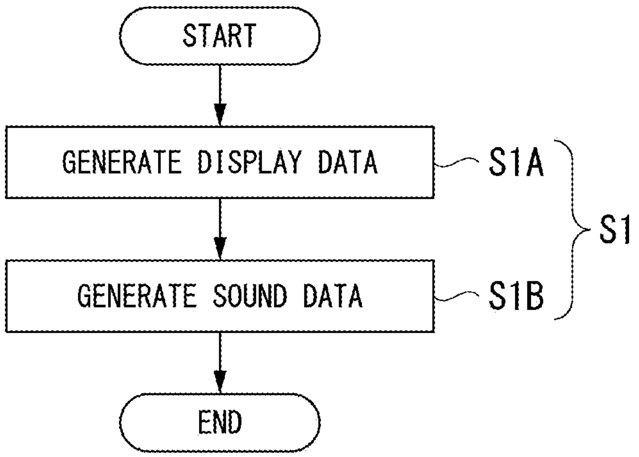
FIG. 10 An explanatory flowchart of an example of a process executed by the virtual space interface device 12X of the first embodiment.

FIG. 10 is an explanatory flowchart of an example of a process executed by the virtual space interface device 12X of the first embodiment.

In the example shown in FIG. 10, the virtual space interface device 12X executes a virtual space providing step S1 of providing a virtual space to the client terminal 11 used by the first user UR1, the client terminal 11-2 used by the second user UR2, the client terminal 11-3 used by the third user UR3, and the client terminal 11-4 used by the fourth user in the routine shown in FIG. 10.

The virtual space providing step S1 includes a display data generating step S1A and a sound data generating step S1B.

In the display data generating step S1A, the virtual space interface device 12X generates display data (display data for the first to fourth client terminals) for causing the display devices 11A of the client terminals 11, 11-2, 11-3, and 11-4 to display an image showing the situation in the virtual space.

Moreover, in the sound data generating step S1B, the virtual space interface device 12X generates sound data (sound data for the first to fourth client terminals) for causing the sound output devices 11B of the client terminals 11, 11-2, 11-3, and 11-4 to output the sound in the virtual space.

In the virtual space providing system 1 to which the virtual space interface device 12X of the first embodiment is applied, the first user UR1, the second user UR2, the third user UR3, and the fourth user can use the virtual space provided by the virtual space providing server 12 without the need for input operations using an operation unit. In other words, the virtual space providing system 1 of the first embodiment can improve the convenience for the first user UR1, the second user UR2, the third user UR3, and the fourth user.

In another example, the visible scenery (an image displayed on the client terminal), the audible sound (a sound output from the client terminal), and the uttered sound (a sound output into the virtual space) may change with a positional relationship between the user and an object in the virtual space. In this example, the object is arranged and displayed at fixed coordinates in the virtual space.

In yet another example, the sounds in the virtual space may be environmental sounds such as sounds uttered by other users' avatars or birds, or the object may output a specific sound. For example, a setting such that music is played from a tree object may be made and music may be heard from the client terminal used by the user when (the coordinates of) the user approaches the object.

In yet another example, the virtual space interface device 12X may output a sound in the virtual space and record a sound (a message) for a specific object, regardless of which user is listening.

Second Embodiment

Hereinafter, a second embodiment of the virtual space interface device, client terminal, and program of the present invention will be described.

A virtual space providing system 2 of the second embodiment is configured like the virtual space providing system 1 of the first embodiment described above, except for the points to be described below. Therefore, the virtual space providing system 2 of the second embodiment can achieve effects similar to those of the virtual space providing system 1 of the first embodiment described above, except for the points to be described below.

Figure 11:
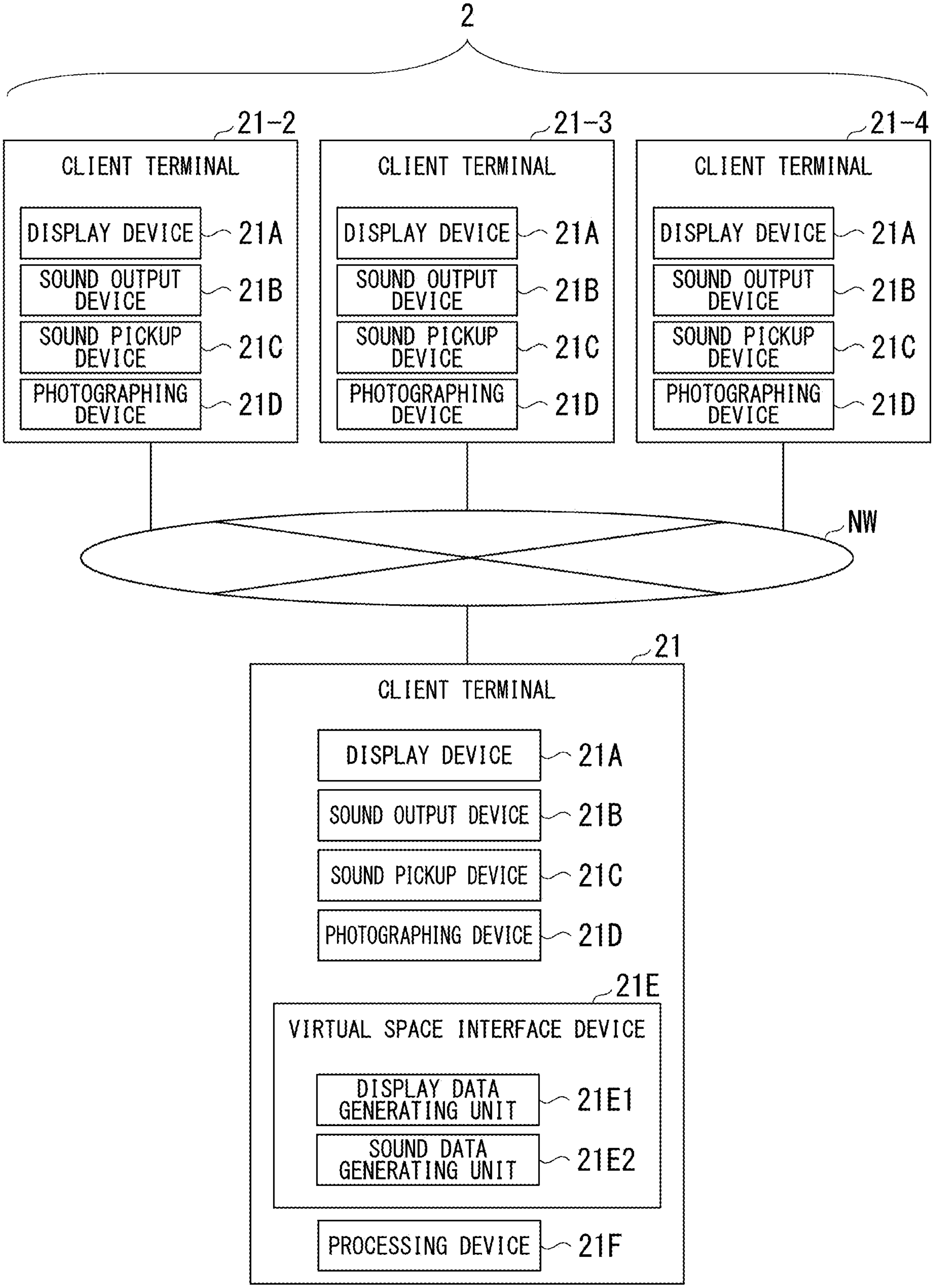
FIG. 11 A diagram showing an example of a virtual space providing system 2 to which a virtual space interface device 21E of a second embodiment is applied.

FIG. 11 is a diagram showing an example of the virtual space providing system 2 to which a virtual space interface device 21E of the second embodiment is applied.

In the example shown in FIG. 11, the virtual space providing system 2 includes client terminals 21, 21-2, 21-3, and 21-4. The client terminals 21, 21-2, 21-3, and 21-4 are connected via a network NW such as the Internet.

Although the virtual space providing system 2 includes four client terminals 21, 21-2, 21-3, and 21-4 in the example shown in FIG. 11, the virtual space providing system 2 may include any number of client terminals other than four in other examples.

In the example shown in FIG. 11, the client terminal 21 is used by, for example, a first user UR1 (see FIG. 3). The client terminal 21 includes a display device 21A, a sound output device 21B, a sound pickup device 21C, a photographing device 21D, a virtual space interface device 21E, and a processing device 21F.

The display device 21A has a function substantially similar to that of the display device 11A shown in FIG. 1 and displays an image (see FIG. 2) showing a situation in a virtual space on the basis of display data provided by the virtual space interface device 21E. The sound output device 21B has a function substantially similar to that of the sound output device 11B shown in FIG. 1 and outputs a sound in the virtual space on the basis of sound data provided by the virtual space interface device 21E. The sound pickup device 21C has a function substantially similar to that of the sound pickup device 11C shown in FIG. 1 and picks up a sound uttered by a first user UR1. The photographing device 21D has a function substantially similar to that of the photographing device 11D shown in FIG. 1, and captures a facial image of the first user UR1.

The virtual space interface device 21E provides a virtual space by providing display data and sound data to the client terminals 21, 21-2, 21-3, and 21-4. The virtual space interface device 21E includes a display data generating unit 21E1 having a function substantially similar to that of the display data generating unit 12A shown in FIG. 1 and a sound data generating unit 21E2 having a function substantially similar to that of the sound data generating unit 12B shown in FIG. 1.

The processing device 21F has a function substantially similar to that of the processing device 12Y shown in FIG. 1.

The client terminal 21-2 is used, for example, by a second user UR2 (see FIG. 8) different from the first user UR1. The client terminal 21-3 is used, for example, by a third user UR3 (see FIG. 9) different from the first user UR1 and the second user UR2.

The client terminal 21-4 is used by, for example, a fourth user different from the first user UR1, the second user UR2, and the third user UR3.

In the example shown in FIG. 11, each of the client terminals 21-2, 21-3, and 21-4 is configured generally like the client terminal 21 except for the virtual space interface device 21E and the processing device 21F. That is, each of the client terminals 21-2, 21-3, and 21-4 includes a display device 21A, a sound output device 21B, a sound pickup device 21C, and a photographing device 21D.

In other examples, the configuration of the client terminal 21 except for the virtual space interface device 21E and the processing device 21F may be different from the configurations of the client terminal 21-2, the client terminal 21-3, and the client terminal 21-4 or the remaining configuration of the client terminal 21 except for the virtual space interface device 21E and the processing device 21F may be different from the configuration of any one of the client terminals 21-2, 21-3, and 21-4.

The display data generating unit 21E1 generates display data for causing the display device 21A of each of the client terminals 21, 21-2, 21-3, and 21-4 to display an image showing the situation in the virtual space.

In detail, the display data generating unit 21E1 generates a first avatar AT1 (see FIG. 2) positioned in the virtual space on the basis of a facial image of the first user UR1 (see FIG. 3) captured by the photographing device 21D of the client terminal 21. Likewise, the display data generating unit 21E1 generates a second avatar AT2 (see FIG. 2) positioned in the virtual space on the basis of a facial image of the second user UR2 (see FIG. 8) captured by the photographing device 21D of the client terminal 21-2, generates a third avatar AT3 (see FIG. 2) positioned in the virtual space on the basis of a facial image of the third user UR3 (see FIG. 9) captured by the photographing device 21D of the client terminal 21-3, and generates a fourth avatar AT4 (see FIG. 2) positioned in the virtual space on the basis of a facial image of the fourth user captured by the photographing device 21D of the client terminal 21-4.

Furthermore, the display data generating unit 21E1 generates display data for the first client terminal for causing the display device 21A of the client terminal 21 to display an image (see FIG. 2) including the first avatar AT1, the second avatar AT2, the third avatar AT3 and the fourth avatar AT4 as an image showing the situation in the virtual space. Likewise, the display data generating unit 21E1 generates display data for the second client terminal for causing the display device 21A of the client terminal 21-2 to display an image including the first avatar AT1, the second avatar AT2, the third avatar AT3, and the fourth avatar AT4 as an image showing the situation in the virtual space, generates display data for the third client terminal for causing the display device 21A of the client terminal 21-3 to display an image including the first avatar AT1, the second avatar AT2, the third avatar AT3, and the fourth avatar AT4 as an image showing the situation in the virtual space, and generates display data for the fourth client terminal for causing the display device 21A of the client terminal 21-4 to display an image including the first avatar AT1, the second avatar AT2, the third avatar AT3, and the fourth avatar AT4 as an image showing the situation in the virtual space.

In the example shown in FIG. 11, the display data generating unit 21E1 controls the enlargement and/or reduction of an image showing the situation in the virtual space displayed by the display device 21A of the client terminal 21 (an image displayed by the display device 21A of the client terminal 21 on the basis of display data for the first client terminal) (see FIG. 2) on the basis of an action of the first user UR1, who is photographed by the photographing device 21D of the client terminal 21, placing the hands of the first user UR1 over the eyes of the first user UR1 (see FIG. 3) and a distance between the photographing device 21D of the client terminal 21 and the face of the first user UR1.

Moreover, the display data generating unit 21E1 also controls the enlargement and/or reduction of an image showing the situation in the virtual space displayed by the display device 11A of the client terminal 21-2 (an image displayed by the display device 21A of the client terminal 21-2 on the basis of display data for the second client terminal) on the basis of an action of the second user UR2, who is photographed by the photographing device 21D of the client terminal 21-2, placing the hands of the second user UR2 over the eyes of the second user UR2 and a distance between the photographing device 21D of the client terminal 21-2 and the face of the second user UR2.

Likewise, the display data generating unit 21E1 controls the enlargement and/or reduction of an image showing the situation in the virtual space displayed by the display device 21A of the client terminal 21-3 (an image displayed by the display device 21A of the client terminal 21-3 on the basis of display data for the third client terminal) on the basis of an action of the third user UR3, which is photographed by the photographing device 21D of the client terminal 21-3, placing the hands of the third user UR3 over the eyes of the third user UR3 and a distance between the photographing device 21D of the client terminal 21-3 and the face of the third user UR3 and controls the enlargement and/or reduction of an image showing the situation in the virtual space displayed by the display device 21A of the client terminal 21-4 (an image displayed by the display device 21A of the client terminal 21-2 on the basis of display data for the fourth client terminal) on the basis of an action of the fourth user, which is photographed by the photographing device 21D of the client terminal 21-4, placing the hands of the fourth user over the eyes of the fourth user and a distance between the photographing device 21D of the client terminal 21-4 and the face of the fourth user.

In the example shown in FIG. 11, the display data generating unit 21E1 controls a position corresponding to the image displayed by the display device 21A of the client terminal 21 as a position in the virtual space on the basis of an action of the first user UR1, who is photographed by the photographing device 21D of the client terminal 21, placing the hands of the first user UR1 over the eyes of the first user UR1 (see FIG. 3) and an orientation of the face of the first user UR1 relative to the photographing device 21D of the client terminal 21.

Moreover, the display data generating unit 21E1 also controls a position corresponding to an image displayed by the display device 21A of the client terminal 21-2 as a position in the virtual space on the basis of an action of the second user UR2, who is photographed by the photographing device 21D of the client terminal 21-2, placing the hands of the second user UR2 over the eyes of the second user UR2 and an orientation of the face of the second user UR2 relative to the photographing device 21D of the client terminal 21-2.

Furthermore, the display data generating unit 21E1 controls a position corresponding to an image displayed by the display device 21A of the client terminal 21-3 as a position in the virtual space on the basis of an action of the third user UR3, who is photographed by the photographing device 21D of the client terminal 21-3, placing the hands of the third user UR3 over the eyes of the third user UR3 and an orientation of the face of the third user UR3 relative to the photographing device 21D of the client terminal 21-3.

Likewise, the display data generating unit 21E1 controls a position corresponding to the image displayed by the display device 21A of the client terminal 21-4 as a position in the virtual space on the basis of an action of the fourth user, who is photographed by the photographing device 21D of the client terminal 21-4, placing the fourth user's hands over the fourth user's eyes and an orientation of the fourth user's face relative to the photographing device 21D of the client terminal 21-4.

In the example shown in FIG. 11, the sound data generating unit 21E2 generates sound data for causing the sound output device 21B of each of the client terminals 21, 21-2, 21-3, and 21-4 to output a sound in the virtual space. In other words, the sound data generating unit 21E2 generates sound data for causing the sound output device 21B of the client terminal 21 to output a sound in the virtual space, sound data for causing the sound output device 21B of the client terminal 21-2 to output a sound in the virtual space, sound data for causing the sound output device 21B of the client terminal 21-3 to output a sound in the virtual space, and sound data for causing the sound output device 21B of the client terminal 21-4 to output a sound in the virtual space.

In detail, the sound data generating unit 21E2 generates sound data for the first client terminal for causing the sound output device 21B of the client terminal 21 to output a sound uttered by the second user UR2, a sound uttered by the third user UR3, and a sound uttered by the fourth user as sounds in a virtual space on the basis of the sound uttered by the second user UR2 picked up by the sound pickup device 21C of the client terminal 21-2, the sound uttered by the third user UR3 picked up by the sound pickup device 21C of the client terminal 21-3, and the sound uttered by the fourth user picked up by the sound pickup device 21C of the client terminal 21-4.

Moreover, the sound data generating unit 21E2 generates sound data for the second client terminal for causing the sound output device 21B of the client terminal 21-2 to output the sound uttered by the first user UR1, the sound uttered by the third user UR3, and the sound uttered by the fourth user as sounds in a virtual space on the basis of the sound uttered by the first user UR1 picked up by the sound pickup device 21C of the client terminal 21, the sound uttered by the third user UR3 picked up by the sound pickup device 21C of the client terminal 21-3, and the sound uttered by the fourth user picked up by the sound pickup device 21C of the client terminal 21-4.

Furthermore, the sound data generating unit 21E2 generates sound data for the third client terminal for causing the sound output device 21B of the client terminal 21-3 to output the sound uttered by the first user UR1, the sound uttered by the second user UR2, and the sound uttered by the fourth user as sounds in a virtual space on the basis of the sound uttered by the first user UR1 picked up by the sound pickup device 21C of the client terminal 21, the sound uttered by the second user UR2 picked up by the sound pickup device 21C of the client terminal 21-2, and the sound uttered by the fourth user picked up by the sound pickup device 21C of the client terminal 21-4.

Moreover, the sound data generating unit 21E2 generates sound data for the fourth client terminal for causing the sound output device 21B of the client terminal 21-4 to output the sound uttered by the first user UR1, the sound uttered by the second user UR2, and the sound uttered by the third user UR3 as sounds in a virtual space on the basis of the sound uttered by the first user UR1 picked up by the sound pickup device 21C of the client terminal 21, the sound uttered by the second user UR2 picked up by the sound pickup device 21C of the client terminal 21-2, and the sound uttered by the third user UR3 picked up by the sound pickup device 21C of the client terminal 21-3.

In the example shown in FIG. 11, the sound data generating unit 21E2 controls a volume of the sound in the virtual space output by the sound output device 21B of the client terminal 21 on the basis of an action of the first user UR1, who is photographed by the photographing device 21D of the client terminal 21, placing the hands of the first user UR1 at the ears of the first user UR1, and a distance between the photographing device 21D of the client terminal 21 and the face of the first user UR1.

The sound data generating unit 21E2 controls a volume of the sound in the virtual space output by the sound output device 21B of the client terminal 21-2 on the basis of an action of the second user UR2, who is photographed by the photographing device 21D of the client terminal 21-2, placing the hands of the second user UR2 at the ears of the second user UR2 (see FIG. 8), and a distance between the photographing device 21D of the client terminal 21-2 and the face of the second user UR2.

The sound data generating unit 21E2 controls a volume of the sound in the virtual space output by the sound output device 21B of the client terminal 21-3 on the basis of an action of the third user UR3, who is photographed by the photographing device 21D of the client terminal 21-3, placing the hands of the third user UR3 at the ears of the third user UR3 and a distance between the photographing device 21D of the client terminal 21-3 and the face of the third user UR3. Moreover, the sound data generating unit 21E2 controls a volume of the sound in the virtual space output by the sound output device 21B of the client terminal 21-4 on the basis of an action of the fourth user, who is photographed by the photographing device 21D of the client terminal 21-4, placing the hands of the fourth user at the ears of the fourth user and a distance between the photographing device 21D of the client terminal 21-4 and the face of the fourth user.

In the example shown in FIG. 11, the sound data generating unit 21E2 controls a direction of arrival of a sound from the virtual space output by the sound output device 21B of the client terminal 21 on the basis of an action of the first user UR1, who is photographed by the photographing device 21D of the client terminal 21, placing the hands of the first user UR1 at the ears of the first user UR1 and an orientation of the face of the first user UR1 relative to the photographing device 21D of the client terminal 21.

In the example shown in FIGS. 2 and 11, the sound data generating unit 21E2 controls volumes of a sound uttered by the second user UR2, a sound uttered by the third user UR3, and a sound uttered by the fourth user, which are output as sounds in the virtual space by the sound output device 21B of the client terminal 21, on the basis of an action of the first user UR1, who is photographed by the photographing device 21D of the client terminal 21, placing the hands of the first user UR1 at the ears of the first user UR1, an orientation of the face of the first user UR1 relative to the photographing device 21D of the client terminal 21, and positions of the second avatar AT2, the third avatar AT3, and the fourth avatar AT4 in the virtual space.

Moreover, in the example shown in FIG. 11, the sound data generating unit 21E2 controls a direction of arrival of the sound from the virtual space output by the sound output device 21B of the client terminal 21-2 on the basis of an action of the second user UR2, who is photographed by the photographing device 21D of the client terminal 21-2, placing the hands of the second user UR2 at the ears of the second user UR2 (see FIG. 8) and an orientation of the face of the second user UR2 relative to the photographing device 21D of the client terminal 21-2.

In the example shown in FIGS. 2 and 11, the sound data generating unit 21E2 controls volumes of a sound uttered by the first user UR1, a sound uttered by the third user UR3, and a sound uttered by the fourth user, which are output as sounds in the virtual space by the sound output device 21B of the client terminal 21-2, on the basis of an action of the second user UR2, who is photographed by the photographing device 21D of the client terminal 21-2, placing the hands of the second user UR2 at the ears of the second user UR2 (see FIG. 8), an orientation of the face of the second user UR2 relative to the photographing device 21D of the client terminal 21-2, and positions of the first avatar AT1, the third avatar AT3, and the fourth avatar AT4 in the virtual space.

Furthermore, in the example shown in FIG. 11, the sound data generating unit 21E2 controls a direction of arrival of the sound from the virtual space output by the sound output device 21B of the client terminal 21-3 on the basis of an action of the third user UR3, who is photographed by the photographing device 21D of the client terminal 21-3, placing the hands of the third user UR3 at the ears of the third user UR3 and an orientation of the face of the third user UR3 relative to the photographing device 21D of the client terminal 21-3.

In the example shown in FIGS. 2 and 11, the sound data generating unit 21E2 controls volumes of a sound uttered by the first user UR1, a sound uttered by the second user UR2, and a sound uttered by the fourth user, which are output as sounds in the virtual space by the sound output device 21B of the client terminal 21-3, on the basis of an action of the third user UR3, who is photographed by the photographing device 21D of the client terminal 21-3, placing the hands of the third user UR3 at the ears of the third user UR3, an orientation of the face of the third user UR3 relative to the photographing device 21D of the client terminal 21-3, and positions of the first avatar AT1, the second avatar AT2, and the fourth avatar AT4 in the virtual space.

Moreover, in the example shown in FIG. 11, the sound data generating unit 21E2 controls a direction of arrival of a sound from the virtual space output by the sound output device 21B of the client terminal 21-4 on the basis of an action of the fourth user, who is photographed by the photographing device 21D of the client terminal 21-4, placing the hands of the fourth user at the fourth user's ears and an orientation of the fourth user's face relative to the photographing device 21D of the client terminal 21-4.

In the example shown in FIGS. 2 and 11, the sound data generating unit 21E2 controls volumes of a sound uttered by the first user UR1, a sound uttered by the second user UR2, and a sound uttered by the third user UR3, which are output as sounds in the virtual space by the sound output device 21B of the client terminal 21-4, on the basis of an action of the fourth user, who is photographed by the photographing device 21D of the client terminal 21-4, placing the fourth user's hands at the fourth user's ears, an orientation of the fourth user's face relative to the photographing device 21D of the client terminal 21-4, and positions of the first avatar AT1, the second avatar AT2 and the third avatar AT3 in the virtual space.

In the example shown in FIG. 11, the sound data generating unit 21E2 controls a volume of a sound in the virtual space (a sound uttered by the first user UR1) output by the sound output device 21B of each of the client terminals 21-2, 21-3, and 21-4 on the basis of an action of the first user UR1, who is photographed by the photographing device 21D of the client terminal 21, placing the hand of the first user UR1 at the mouth of the first user UR1 and a distance between the photographing device 21D of the client terminal 21 and the face of the first user UR1.

Moreover, the sound data generating unit 21E2 controls a volume of a sound in the virtual space (a sound uttered by the second user UR2) output by the sound output device 21B of each of the client terminals 21, 21-3, and 21-4 on the basis of an action of the second user UR2, who is photographed by the photographing device 21D of the client terminal 21-2, placing the hand of the second user UR2 at the mouth of the second user UR2 and a distance between the photographing device 21D of the client terminal 21-2 and the face of the second user UR2.

Furthermore, the sound data generating unit 21E2 controls a volume of a sound (a sound uttered by the third user UR3) in the virtual space output by the sound output device 21B of each of the client terminals 21, 21-2, and 21-4 on the basis of an action of the third user UR3, who is photographed by the photographing device 21D of the client terminal 21-3, placing the hand of the third user UR3 at the mouth of the third user UR3 (see FIG. 9) and a distance between the photographing device 21D of the client terminal 21-3 and the face of the third user UR3. Moreover, the sound data generating unit 21E2 controls a volume of a sound (a sound uttered by the fourth user) in the virtual space output by the sound output device 21B of each of the client terminals 21, 21-2, and 21-3 on the basis of an action of the fourth user, who is photographed by the photographing device 21D of the client terminal 21-4, placing the hand of the fourth user at the mouth of the fourth user and a distance between the photographing device 21D of the client terminal 21-4 and the face of the fourth user.

In the example shown in FIG. 11, the sound data generating unit 21E2 controls a direction in which the sound uttered by the first user UR1 (the sound picked up by the sound pickup device 21C of the client terminal 21) is output into the virtual space on the basis of an action of the first user UR1, who is photographed by the photographing device 21D of the client terminal 21, placing the hand of the first user UR1 at the mouth of the first user UR1 and an orientation of the face of the first user UR1 relative to the photographing device 21D of the client terminal 21.

In the example shown in FIGS. 2 and 11, the sound data generating unit 21E2 controls a volume of the sound uttered by the first user UR1 to be output as a sound in the virtual space by the sound output device 21B of the client terminal 21-2, controls a volume of the sound uttered by the first user UR1 to be output as a sound in the virtual space by the sound output device 21B of the client terminal 21-3, and controls a volume of the sound uttered by the first user UR1 to be output as a sound in the virtual space by the sound output device 21B of the client terminal 21-4, on the basis of an action of the first user UR1, who is photographed by the photographing device 21D of the client terminal 21, placing the hand of the first user UR1 at the mouth of the first user UR1, an orientation of the face of the first user UR1 relative to the photographing device 21D of the client terminal 21, and positions of the second avatar AT2, the third avatar AT3, and the fourth avatar AT4 in the virtual space.

In other words, the sound data generating unit 21E2 controls a direction in which the sound uttered by the first user UR1 and picked up by the sound pickup device 21C of the client terminal 21 is emitted (output) into the virtual space.

Moreover, in the example shown in FIG. 11, the sound data generating unit 21E2 controls a direction in which the sound uttered by the second user UR2 (the sound picked up by the sound pickup device 21C of the client terminal 21-2) is output into the virtual space on the basis of an action of the second user UR2, who is photographed by the photographing device 21D of the client terminal 21-2, placing the hand of the second user UR2 at the mouth of the second user UR2 and an orientation of the face of the second user UR2 relative to the photographing device 21D of the client terminal 21-2.

In the example shown in FIGS. 2 and 11, the sound data generating unit 21E2 controls a volume of the sound uttered by the second user UR2 to be output as a sound in the virtual space by the sound output device 21B of the client terminal 21, controls a volume of the sound uttered by the second user UR2 to be output as a sound in the virtual space by the sound output device 21B of the client terminal 21-3, and controls a volume of the sound uttered by the second user UR2 to be output as a sound in the virtual space by the sound output device 21B of the client terminal 21-4, on the basis of an action of the second user UR2, which is photographed by the photographing device 21D of the client terminal 21-2, placing the hand of the second user UR2 at the mouth of the second user UR2, an orientation of the face of the second user UR2 relative to the photographing device 21D of the client terminal 21-2, and positions of the first avatar AT1, the third avatar AT3, and the fourth avatar AT4 in the virtual space.

In other words, the sound data generating unit 21E2 controls a direction in which the sound uttered by the second user UR2 and picked up by the sound pickup device 21C of the client terminal 21-2 is emitted (output) into the virtual space.

Furthermore, in the example shown in FIG. 11, the sound data generating unit 21E2 controls a direction in which the sound uttered by the third user UR3 (the sound picked up by the sound pickup device 21C of the client terminal 21-3) is output into the virtual space on the basis of an action of the third user UR3, who is photographed by the photographing device 21D of the client terminal 21-3, placing the hand of the third user UR3 at the mouth of the third user UR3 (see FIG. 9) and an orientation of the face of the third user UR3 relative to the photographing device 21D of the client terminal 21-3.

In the example shown in FIGS. 2 and 11, the sound data generating unit 21E2 controls a volume of a sound uttered by the third user UR3 to be output as a sound in the virtual space by the sound output device 21B of the client terminal 21, controls a volume of a sound uttered by the third user UR3 to be output as a sound in the virtual space by the sound output device 21B of the client terminal 21-2, and controls a volume of the sound uttered by the third user UR3 to be output as a sound in the virtual space by the sound output device 21B of the client terminal 21-4, on the basis of an action of the third user UR3, who is photographed by the photographing device 21D of the client terminal 21-3, placing the hand of the third user UR3 at the mouth of the third user UR3 (see FIG. 9), an orientation of the face of the third user UR3 relative to the photographing device 21D of the client terminal 21-3, and positions of the first avatar AT1, the second avatar AT2, and the fourth avatar AT4 in the virtual space.

Moreover, in the example shown in FIG. 11, the sound data generating unit 21E2 controls a direction in which the sound uttered by the fourth user UR4 (the sound picked up by the sound pickup device 21C of the client terminal 21-4) is output into the virtual space on the basis of an action of the fourth user, who is photographed by the photographing device 21D of the client terminal 21-4, placing the fourth user's hand at the fourth user's mouth and an orientation of the fourth user's face relative to the photographing device 21D of the client terminal 21-4.

In the example shown in FIGS. 2 and 11, the sound data generating unit 21E2 controls a volume of the sound uttered by the fourth user to be output as a sound in the virtual space by the sound output device 21B of the client terminal 21, controls a volume of the sound uttered by the fourth user to be output as a sound in the virtual space by the sound output device 21B of the client terminal 21-2, and controls a volume of the sound uttered by the fourth user to be output as a sound in the virtual space by the sound output device 21B of the client terminal 21-3, on the basis of an action of the fourth user, who is photographed by the photographing device 21D of the client terminal 21-4, placing the fourth user's hand at the fourth user's mouth, an orientation of the fourth user's face relative to the photographing device 21D of the client terminal 21-4, and positions of the first avatar AT1, the second avatar AT2, and the third avatar AT3 in the virtual space.

As described above, in the example shown in FIG. 11, the display data generating unit 21E1 and the sound data generating unit 21E2 of the virtual space interface device 21E of the client terminal 21 control at least one item of the display data for the first client terminal for causing the display device 21A of the client terminal 21 to display an image showing the situation in the virtual space, display data for the second client terminal for causing the display device 21A of the client terminal 21-2 to display an image showing the situation in the virtual space, display data for the third client terminal for causing the display device 21A of the client terminal 21-3 to display an image showing the situation in the virtual space, the display data for the fourth client terminal for causing the display device 21A of the client terminal 21-4 to display an image showing the situation in the virtual space, the sound data for the first client terminal for causing the sound output device 21B of the client terminal 21 to output the sound in the virtual space, the sound data for the second client terminal for causing the sound output device 21B of the client terminal 21-2 to output the sound in the virtual space, the sound data for the third client terminal for causing the sound output device 21B of the client terminal 21-3 to output the sound in the virtual space, and the sound data for the fourth client terminal for causing the sound output device 21B of the client terminal 21-4 to output the sound in the virtual space as a control target, on the basis of a gesture of positioning the hands at the face area of the first user UR1 photographed by the photographing device 21D of the client terminal 21 (an action of placing the hands over the eyes, an action of placing the hands at the ears, or an action of placing the hand at the mouth), a positional relationship between the photographing device 21D of the client terminal 21 and the face of the first user UR1 (approaching, moving away, facing the left of the photographing device 21D of the client terminal 21, or facing the right of the photographing device 21D of the client terminal 21), a gesture of positioning the hands at the face area of the second user UR2 photographed by the photographing device 21D of the client terminal 21-2 (an action of placing the hands over the eyes, an action of placing the hands at the ears, or an action of placing the hand at the mouth), a positional relationship between the photographing device 21D of the client terminal 21-2 and the face of the second user UR2 (approaching, moving away, facing the left of the photographing device 21D of the client terminal 21-2, or facing the right of the photographing device 21D of the client terminal 21-2), a gesture of positioning the hands at the face area of the third user UR3 photographed by the photographing device 21D of the client terminal 21-3 (an action of placing the hands over the eyes, an action of placing the hands at the ears, or an action of placing the hand at the mouth), a positional relationship between the photographing device 21D of the client terminal 21-3 and the face of the third user UR3 (approaching, moving away, facing the left of the photographing device 21D of the client terminal 21-3, or facing the right of the photographing device 21D of the client terminal 21-3), a gesture of positioning the hands at the face area of the fourth user photographed by the photographing device 21D of the client terminal 21-4 (an action of placing the hands over the eyes, an action of placing the hands at the ears, or an action of placing the hand at the mouth), and a positional relationship between the photographing device 21D of the client terminal 21-4 and the face of the fourth user (approaching, moving away, facing the left of the photographing device 21D of the client terminal 21-4, or facing the right of the photographing device 21D of the client terminal 21-4).

Furthermore, the display data generating unit 21E1 and the sound data generating unit 21E2 differentiate the control target (at least one item of the display data for the first to fourth client terminals and the sound data for the first to fourth client terminals) in accordance with a part (the eye, ear, or mouth) of the face area where the first user UR1 positions the hand, a part (the eye, ear, or mouth) of the face area where the second user UR2 positions the hand, a part (the eye, ear, or mouth) of the face area where the third user UR3 positions the hand, and a part (the eye, ear, or mouth) of the face area where the fourth user positions the hand.

Figure 12:
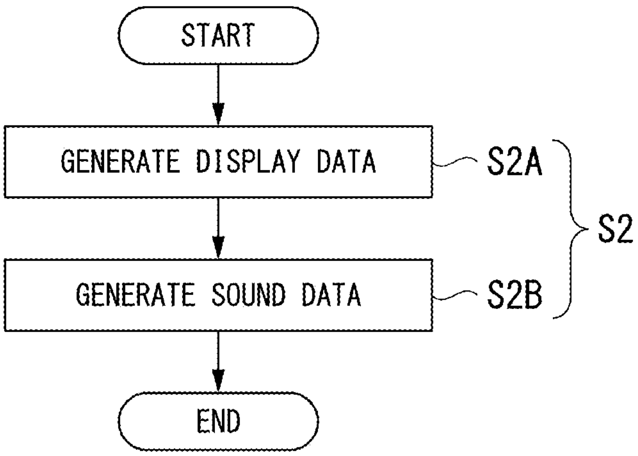
FIG. 12 An explanatory flowchart of an example of a process executed by the virtual space interface device 21E of the second embodiment.

FIG. 12 is an explanatory flowchart of an example of a process executed by the virtual space interface device 21E of the second embodiment.

In the example shown in FIG. 12, the virtual space interface device 21E executes a virtual space providing step S2 of providing a virtual space to the client terminal 21 used by the first user UR1, the client terminal 21-2 used by the second user UR2, the client terminal 21-3 used by the third user UR3, and the client terminal 21-4 used by the fourth user in the routine shown in FIG. 12.

The virtual space providing step S2 includes a display data generating step S2A and a sound data generating step S2B.

In the display data generating step S2A, the virtual space interface device 21E generates display data (display data for the first to fourth client terminals) for causing the display device 21A of each of the client terminals 21, 21-2, 21-3, and 21-4 to display an image showing the situation in the virtual space.

Moreover, in the sound data generating step S2B, the virtual space interface device 21E generates sound data (sound data for the first to fourth client terminals) for causing the sound output devices 11B of the client terminals 21, 21-2, 21-3, and 21-4 to output the sound in the virtual space.

In the virtual space providing system 2 to which the virtual space interface device 21E of the second embodiment is applied, the first user UR1, the second user UR2, the third user UR3, and the fourth user can use the virtual space provided by the virtual space interface device 21E without the need for input operations using the operation unit. In other words, the virtual space providing system 2 of the second embodiment can improve the convenience for the first user UR1, the second user UR2, the third user UR3, and the fourth user.

Although modes for carrying out the present invention have been described using embodiments, the present invention is not limited to the embodiments and various modifications and substitutions can also be made without departing from the scope and spirit of the present invention. The configurations described in the above-described embodiments and examples may be combined.

Also, all or some of the functions of the parts provided in the virtual space providing systems 1 and 2 according to the above-described embodiment may be implemented by recording a program for implementing the functions on a computer-readable recording medium and causing a computer system to read and execute the program recorded on the recording medium. Also, the "computer system" described here is assumed to include software such as an operating system (OS) and hardware such as peripheral devices.

Moreover, the "computer readable recording medium" refers to a flexible disk, a magneto-optical disc, a ROM, a portable medium such as a CD-ROM, or a storage unit such as a hard disk embedded in the computer system. Further, the "computer readable recording medium" may include a computer readable recording medium for dynamically holding the program for a short time period as in a communication line when the program is transmitted via a network such as the Internet or a communication circuit such as a telephone circuit and a computer readable recording medium for holding the program for a given time period as in a volatile memory inside the computer system serving as a server or a client when the program is transmitted. Also, the above-described program may be a program for implementing some of the above-described functions. Furthermore, the above-described program may be a program capable of implementing the above-described function in combination with a program already recorded on the computer system.

REFERENCE SIGNS LIST

1 Virtual space providing system
11, 11-2, 11-3, 11-4 Client terminal
11A Display device
11B Sound output device
11C Sound pickup device
11D Photographing device
12 Virtual space providing server
12A Display data generating unit
12B Sound data generating unit
12X Virtual space interface device
12Y Processing device
2 Virtual space providing system
21, 21-2, 21-3, 21-4 Client terminal
21A Display device
21B Sound output device
21C Sound pickup device
21D Photographing device
21E Virtual space interface device
21E1 Display data generating unit
21E2 Sound data generating unit
21F Processing device
NW Network
UR1 First user
UR2 Second user
UR3 Third user
AT1 First avatar
AT2 Second avatar
AT3 Third avatar
AT4 Fourth avatar

The invention claimed is:

1. A virtual space interface device provided in a virtual space providing system having at least a client terminal used by a user, wherein the client terminal includes:

a display device configured to display an image showing a situation in the virtual space, a sound output device configured to output a sound in the virtual space, a sound pickup device configured to pick up a sound uttered by the user, and a photographing device configured to capture a facial image of the user, wherein the virtual space interface device includes:

a processor coupled to a memory storing instructions for the processor to execute:

a display data generating unit configured to generate display data for causing the display device of the client terminal to display the image showing the situation in the virtual space; and a sound data generating unit configured to generate sound data for causing the sound output device of the client terminal to output the sound in the virtual space, wherein the sound data generating unit generates sound data for outputting user-uttered sound picked up by the sound pickup device of the client terminal into the virtual space, wherein the display data generating unit and the sound data generating unit control at least one item of the display data for causing the display device of the client terminal to display the image showing the situation in the virtual space, the sound data for causing the sound output device of the client terminal to output the sound in the virtual space, and the sound data for outputting the sound uttered by the user into the virtual space, as a control target, on a basis of a gesture of positioning the user's hands at an area of the user's face photographed by the photographing device of the client terminal and a positional relationship between the photographing device of the client terminal and the user's face, wherein the display data generating unit and the sound data generating unit differentiate the control target in accordance with a part of the face area where the user positions the user's hands, wherein the display data generating unit controls at least one of enlargement and reduction of the image showing the situation in the virtual space displayed by the display device of the client terminal on the basis of an action of the user, who is photographed by the photographing device of the client terminal, placing the user's hands over the user's eyes and a distance between the photographing device of the client terminal and the user's face, wherein the sound data generating unit controls a volume of the sound in the virtual space output by the sound output device of the client terminal on the basis of an action of the user, who is photographed by the photographing device of the client terminal, placing the user's hands at the user's ears and the distance between the photographing device of the client terminal and the user's face, and wherein the sound data generating unit controls a volume of the user-uttered sound picked up by the sound pickup device of the client terminal and output into the virtual space on the basis of an action of the user, who is photographed by the photographing device of the client terminal, placing the user's hand at the user's mouth and the distance between the photographing device of the client terminal and the user's face.

2. The virtual space interface device according to claim 1, wherein the display data generating unit controls a position corresponding to the image displayed by the display device of the client terminal as a position in the virtual space on the basis of an action of the user, who is photographed by the photographing device of the client terminal, placing the user's hands over the user's eyes and an orientation of the user's face relative to the photographing device of the client terminal, wherein the sound data generating unit controls a direction of arrival of the sound from the virtual space output by the sound output device of the client terminal on the basis of an action of the user, who is photographed by the photographing device of the client terminal, placing the user's hands at the user's ears and the orientation of the user's face relative to the photographing device of the client terminal, and wherein the sound data generating unit controls a direction in which the sound uttered by the user is output to the virtual space on the basis of an action of the user, who is photographed by the photographing device of the client terminal, placing the user's hand at the user's mouth and the orientation of the user's face relative to the photographing device of the client terminal.

3. A virtual space interface device provided in a virtual space providing system having at least a client terminal used by a user, wherein the client terminal includes:

a sound output device configured to output a sound in the virtual space, a sound pickup device configured to pick up a sound uttered by the user, and a photographing device configured to capture a facial image of the user, wherein the virtual space interface device includes a processor coupled to a memory storing instructions for the processor to execute:

a sound data generating unit configured to generate sound data for causing the sound output device of the client terminal to output the sound in the virtual space, wherein the sound data generating unit generates sound data for outputting user-uttered sound picked up by the sound pickup device of the client terminal into the virtual space, wherein the sound data generating unit controls at least one item of the sound data for causing the sound output device of the client terminal to output the sound in the virtual space and the sound data for outputting the sound uttered by the user into the virtual space, as a control target, on the basis of a gesture of positioning the user's hands at an area of the user's face photographed by the photographing device of the client terminal and a positional relationship between the photographing device of the client terminal and the user's face and differentiates the control target in accordance with a part of the face area where the user positions the user's hands, and wherein the sound data generating unit controls a volume of the sound in the virtual space output by the sound output device of the client terminal on a basis of an action of the user, who is photographed by the photographing device of the client terminal, placing the user's hands at the user's ears and a distance between the photographing device of the client terminal and the user's face.

4. The virtual space interface device according to claim 3, wherein the sound data generating unit controls a volume of the user-uttered sound picked up by the sound pickup device of the client terminal and output into the virtual space on the basis of an action of the user, who is photographed by the photographing device of the client terminal, placing the user's hand at the user's mouth and the distance between the photographing device of the client terminal and the user's face.

5. The virtual space interface device according to claim 3, wherein the sound data generating unit controls a direction of arrival of the sound from the virtual space output by the sound output device of the client terminal on a basis of an action of the user, who is photographed by the photographing device of the client terminal, placing the user's hands at the user's ears and an orientation of the user's face relative to the photographing device of the client terminal.

6. The virtual space interface device according to claim 3, wherein the sound data generating unit controls a direction in which the sound uttered by the user is output to the virtual space on a basis of an action of the user, who is photographed by the photographing device of the client terminal, placing the user's hand at the user's mouth and an orientation of the user's face relative to the photographing device of the client terminal.

7. A virtual space interface control method for controlling a virtual space providing system having at least a client terminal used by a user, the virtual space interface control method comprising:

generating, by a computer, display data for causing a display device of the client terminal to display an image showing a situation in a virtual space;

generating, by the computer, first sound data for outputting a user-uttered sound picked up by a sound pickup device of the client terminal into the virtual space;

generating, by the computer, second sound data for causing a sound output device of the client terminal to output a sound in the virtual space;

performing, by the computer, control by differentiating at least one item of the display data, the first sound data, and the second sound data in accordance with a part of a face area where the user positions the user's hands on the basis of a gesture of positioning the user's hands at an area of the user's face photographed by a photographing device of the client terminal and a positional relationship between the photographing device of the client terminal and the user's face;

controlling at least one of enlargement and reduction of the image showing the situation in the virtual space displayed by the display device of the client terminal on a basis of an action of the user, who is photographed by the photographing device of the client terminal, placing the user's hands over the user's eyes and a distance between the photographing device of the client terminal and the user's face, controlling a volume of the sound in the virtual space output by the sound output device of the client terminal on the basis of an action of the user, who is photographed by the photographing device of the client terminal, placing the user's hands at the user's ears and the distance between the photographing device of the client terminal and the user's face; and controlling a volume of the user-uttered sound picked up by the sound pickup device of the client terminal and output into the virtual space on the basis of an action of the user, who is photographed by the photographing device of the client terminal, placing the user's hand at the user's mouth and the distance between the photographing device of the client terminal and the user's face.

* * * * *